United States Patent
Enberg

(10) Patent No.: US 6,718,213 B1
(45) Date of Patent: Apr. 6, 2004

(54) VARIABLE BASE LOAD ENERGY MANAGEMENT SYSTEM AND METHOD

(75) Inventor: Denis Enberg, Elgin, IL (US)

(73) Assignee: Electric City Corporation, Elk Grove Village, IL (US)

( * ) Notice: Subject to any disclaimer, the term of this patent is extended or adjusted under 35 U.S.C. 154(b) by 267 days.

(21) Appl. No.: 09/679,812

(22) Filed: Oct. 5, 2000

Related U.S. Application Data

(60) Provisional application No. 60/212,622, filed on Jun. 19, 2000.

(51) Int. Cl.[7] .............................................. G05B 11/01
(52) U.S. Cl. ............................. 700/22; 700/12; 700/16; 700/286; 700/291; 700/292; 700/293; 700/294; 700/295; 700/296; 700/297; 700/298; 324/116; 324/142; 340/870.02; 705/412; 315/86; 315/87
(58) Field of Search .......................... 700/22, 291, 295, 700/292, 294, 293, 296, 297–298, 12, 16, 286; 324/116, 142; 340/870.02; 705/412; 315/86, 87

(56) References Cited

U.S. PATENT DOCUMENTS

| | | | | |
|---|---|---|---|---|
| 5,289,362 A | * | 2/1994 | Liebl et al. ................... | 700/22 |
| 5,598,349 A | * | 1/1997 | Elliason et al. ............. | 700/295 |
| 5,734,230 A | * | 3/1998 | Edwards et al. ............... | 315/86 |
| 5,953,237 A | * | 9/1999 | Indermaur et al. .......... | 700/295 |
| 6,185,483 B1 | * | 2/2001 | Drees ......................... | 700/295 |

FOREIGN PATENT DOCUMENTS

| | | |
|---|---|---|
| WO | WO 98/53648 | 11/1998 |

* cited by examiner

*Primary Examiner*—Ramesh Patel
*Assistant Examiner*—Douglas Shute
(74) *Attorney, Agent, or Firm*—Swidler Berlin Shereff Friedman, LLP

(57) ABSTRACT

The present invention is a system and method for variable base load demand-side energy management. The system of the present invention includes a power reduction device receiving electrical power from an electrical power source and outputting electrical power to a load. The system of the present invention can control the power delivered to one or more devices in a single facility or to multiple facilities. The system of the present invention can control the power delivered to one or more devices located in one or more facilities by sending control signals over various kinds of networks using various communication methods simultaneously, such as a modem, a LAN, or a WAN such as the Internet.

24 Claims, 17 Drawing Sheets

FIG. 10

AVG_VOLTS_1L1 [01:1L1 TREND LOG

MAIN | SETUP | ASSIGNMENT | TREND DATA

SAMPLES: ON  200
FREQUENCY: 200  01:00:00 [HH:MM:SS]
LAST SAMPLE: 06:52:34  16-JUN-2000  AUTO

| TIME | AVG_VOLTS_1 | AVG_VOLTS_2 | AVG_VOLTS_3 | KW_TOTAL |
|---|---|---|---|---|
| 05:52/06/16 | 227.2 | 226.8 | 226.1 | 18.4 |
| 04:52/06/16 | 226.5 | 225.4 | 227.7 | 18.6 |
| 03:52/06/16 | 227.2 | 225.0 | 227.6 | 31.9 |
| 02:52/06/16 | 227.5 | 226.5 | 226.7 | 32.3 |
| 01:52/06/16 | 226.9 | 226.4 | 226.7 | 32.6 |
| 00:52/06/16 | 225.9 | 226.6 | 234.5 | 31.9 |
| 23:52/06/15 | 237.4 | 236.1 | 231.6 | 32.1 |
| 22:52/06/15 | 230.9 | 231.3 | 231.8 | 33.8 |
| 21:52/06/15 | 231.3 | 231.6 | 236.8 | 33.6 |
| 20:52/06/15 | 238.0 | 238.0 | 233.4 | 33.6 |
| 19:52/06/15 | 230.9 | 231.9 | 229.9 | 32.2 |
| 18:52/06/15 | 230.8 | 229.9 | 231.7 | 15.8 |
| 17:52/06/15 | 232.2 | 232.3 | 232.2 | 15.8 |
| 16:52/06/15 | 229.6 | 230.1 | 231.8 | 15.7 |
| 15:52/06/15 | 229.8 | 229.3 | 232.1 | 15.7 |
| 15:52/06/15 | 231.6 | 230.7 | 232.2 | 15.6 |

PRINT TREND    OK    CANCEL    APPLY

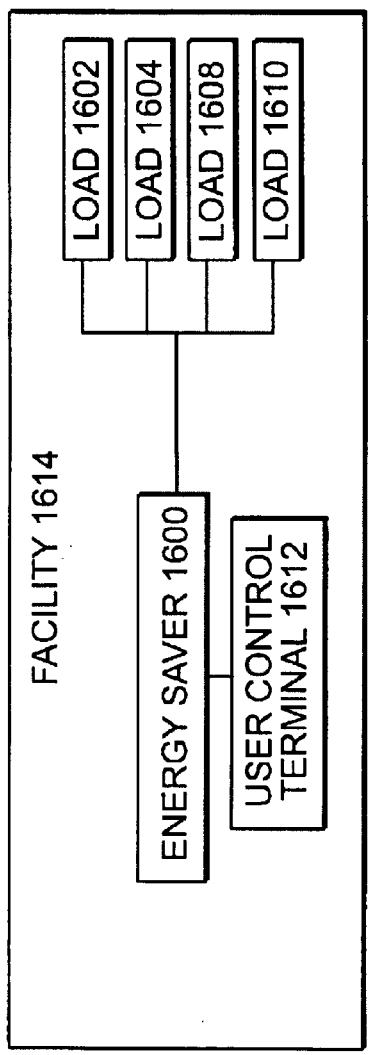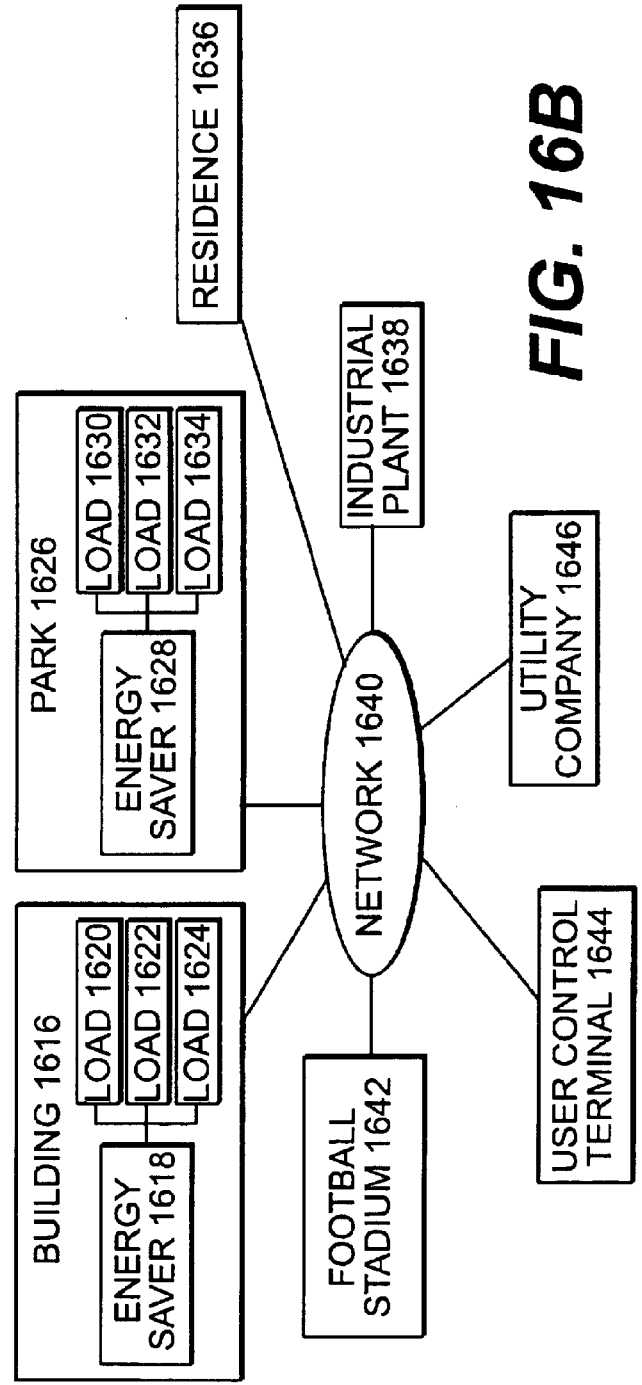

VARIABLE BASE LOAD ENERGY MANAGEMENT SYSTEM AND METHOD

This application claims the benefits of U.S. Provisional Application No. 60/212,622, filed Jun. 19, 2000.

FIELD OF THE INVENTION

The present invention relates to an energy management system. More particularly, the present invention relates to a variable base load demand side energy management system for both stand-alone and networking applications.

BACKGROUND OF THE INVENTION

In the past, utility companies that provided electricity to consumers charged a fixed cost of electricity per kilowatt hour. The cost of the electricity did not vary during different periods of the day. The utility companies averaged out the cost of electricity during the day to establish the price charged. As a consequence of this fixed rate pricing, a company which operated mostly at night was probably paying too much for its electricity. On the flip side, a retailer operating only during the day was probably paying too little.

Due to the worldwide electric privatization and deregulation movement, many utility companies are now starting to vary the rate charged for electricity during the course of a day. This is referred to as real-time pricing. For example, on a hot summer day in the city when a high amount of air conditioning is being used, at 12:00 PM the price of electricity charged to the customer could be 3 cents per kilowatt-hour. At 1:00 PM, the electricity demand increases due to increasing heat and air conditioning use, and the price climbs to 4 cents. By 3:00 PM, the demand is at its peak and the price has gone up to $1.06.

In response to this sharp increase in price, a consumer of electricity may wish to decrease the amount of electricity that he consuming in order to cut down on costs. A consumer of electricity could be an owner of a building, an owner of an industrial plant, a home owner, or any other individual or business purchasing electricity from the utility company. In the past, the consumer typically could reduce his or her demand by turning off loads such as individual lights or pumps. Alternatively, the consumer could reduce the on-time of cyclic loads such as air conditioners. For example, the consumer could raise the thermostat setting to decrease the amount of on-time for the air conditioner. Reducing the on-time of cyclic loads has the effect of reducing the peaks of the consumer's power usage during the day.

What is needed is a system that allows a user to conveniently and automatically vary his or her "base load" during the day in response to a changing price of electricity. A "base load" is a constant load which remains on all day. A base load does not turn off until the facility or the process is no longer needed, unlike cyclic motors and pumps which turn on and off and vary on-time according to the external conditions. Lighting is an example of a base load which exists in almost every commercial or industrial building.

Instead of reducing demand by shutting off lights and other loads, it would be advantageous to have a system which allowed the user to merely reduce the lighting power or other base loads during periods of the day when the electricity usage is most expensive. For example, if the electricity rate is most expensive at 3:00pm, a user could reduce his costs by having a system which automatically dimmed the lights at 3:00 PM, rather than shutting off half the lights in the building.

What is needed is a system that can perform variable base load, demand-side management for energy management and conservation, in all types of commercial, industrial and public sector facilities and areas. What is also needed is a system that can interface and communicate with various proprietary and open protocol automation systems over a computer network in addition to having stand-alone capabilities. What is also needed is a system that can provide control safety algorithms to insure the lamps and ballasts are properly protected. Finally, what is needed is a controller that can has the flexibility to control the lamp loads using a variety of different inputs such as voltage, kW, current, light level, analog and digital inputs from other controllers, and schedules.

SUMMARY OF THE INVENTION

The present invention is a system and method for variable base load demand-side energy management. The system of the present invention includes a power reduction device receiving electrical power from an electrical power source and outputting electrical power to a load. A processor outputs a control signal to the power reduction device to decrease the power delivered to the load in response to a rise in the price of electricity and increase the power delivered to the load in response to a decrease in the price of electricity. The processor can do this by receiving a schedule from a user, the schedule including control setpoints for different time periods during the day and/or week. The processor then generates the control signal based on the schedule and the time of day. The processor can also receive real-time price information from the electrical utility company. The processor generates the control signal based on the real-time price information.

The processor can also receive input variables such as voltage, current, light level, and power and can control the power reduction device so as to maintain one or more user specified input variables within a user-specified control band. A user terminal can receive control instructions from a user. The user terminal and processor can be connected to a computer network, and the control instructions sent to the processor over the computer network. This allows a user terminal to control many remote processors over the computer network.

The system of the present invention can control the power delivered to one or more devices located in one or more facilities by sending control signals over various kinds of networks using various communication methods simultaneously, such as a modem, a LAN, or a WAN such as the Internet.

BRIEF DESCRIPTION OF THE DRAWINGS

FIG. 10 is an example of a text trend log screen 1000 in an embodiment of the present invention.

FIG. 16A schematically shows a stand-alone embodiment of the present invention.

FIG. 16B schematically illustrates a networked embodiment of the present invention.

DETAILED DESCRIPTION OF THE INVENTION

Figure 1:
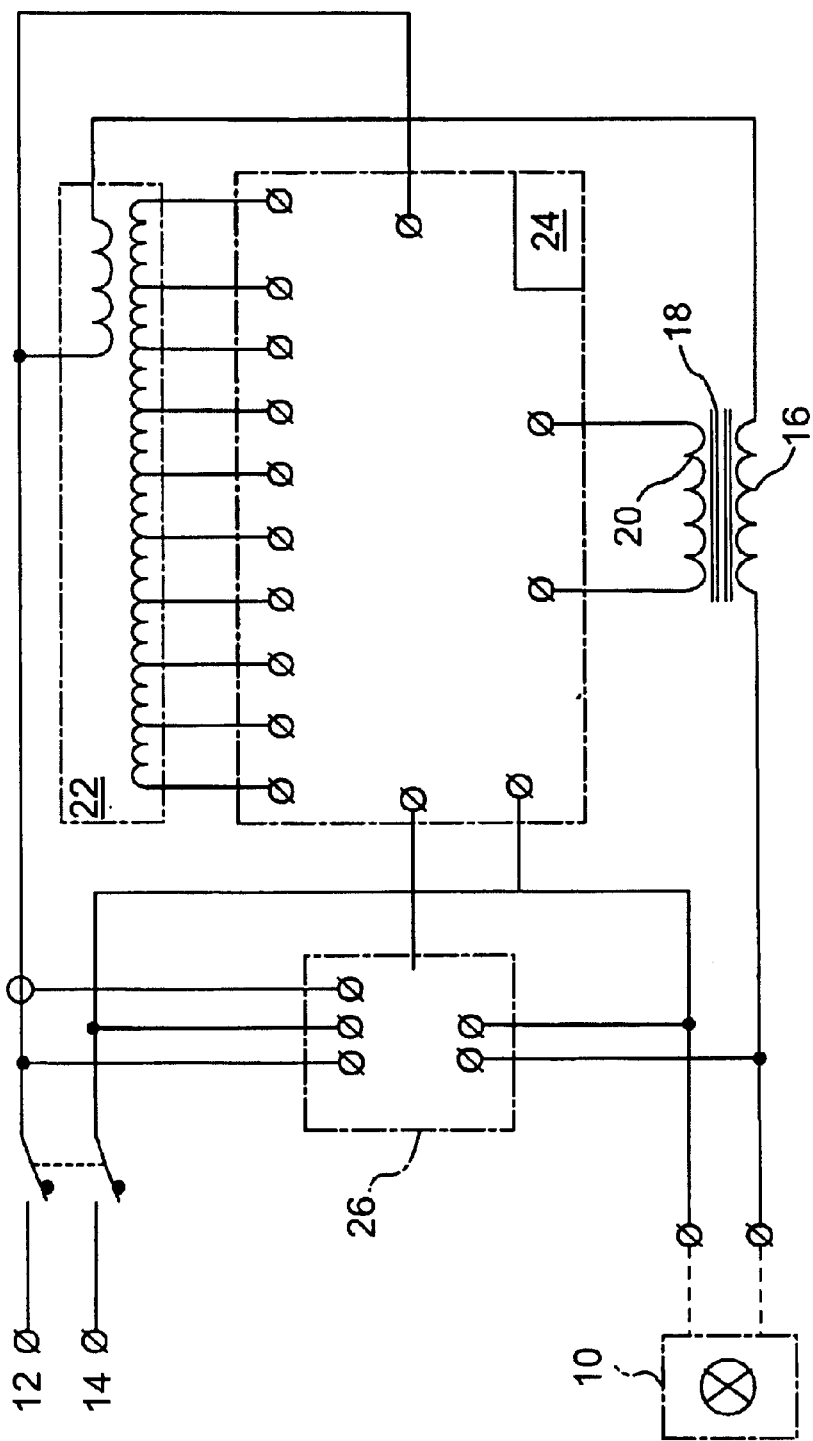
FIG. 1 schematically illustrates a prior art power reducing device.
Figure 2:
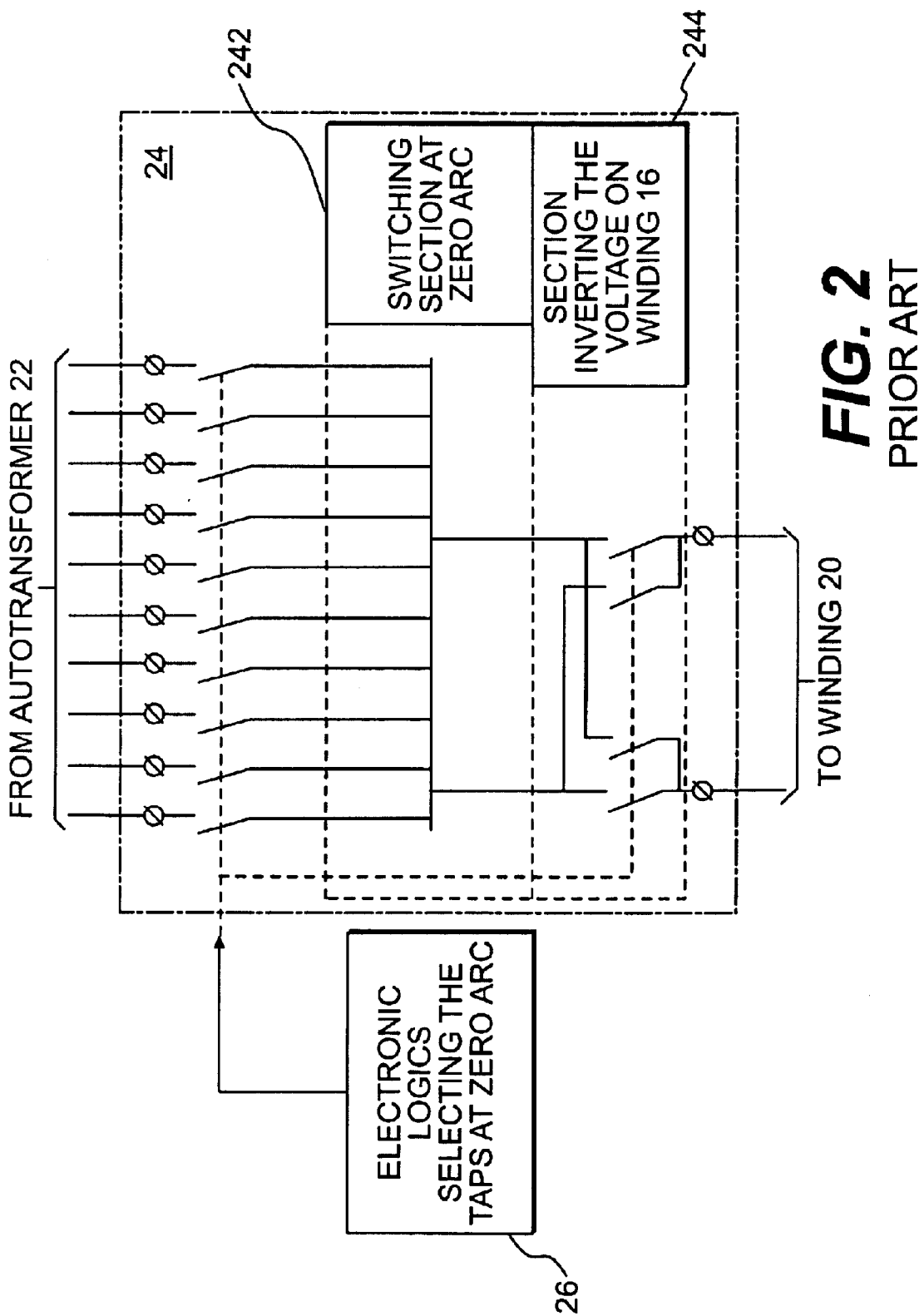
FIG. 2 schematically illustrates a portion of the prior art device of FIG. 1.
Figure 3:
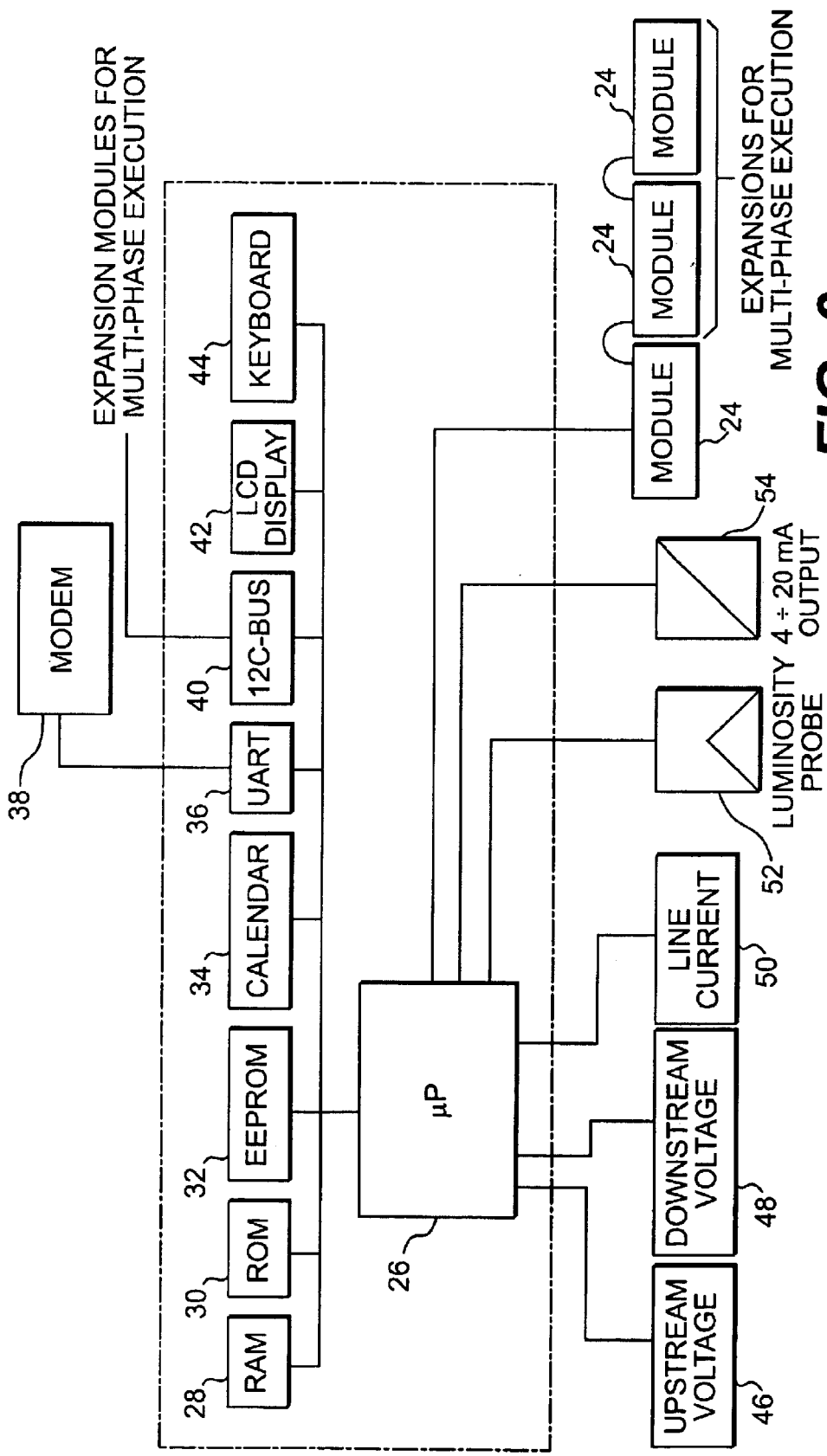
FIG. 3 schematically illustrates a control part of the FIG. 1 device.

FIGS. 1–3 illustrate a power reducing device 100 which is described in PCT WO 98/53648. Power reducing device 100 is used in the system of the present invention, which will be described later beginning with FIG. 4.

Power reducing device 100 can work in a discrete manner, but is also able, by virtue of a precise calibration of the intervention steps, to progressively reduce or increase the power supplied to the lamps of a lighting application without abrupt voltage changes, both at the initial light-on, and at the final light-off time, while keeping a simple and reliable structure, therefor having an economical construction and servicing.

With reference to FIG. 1, a lighting system 100 is shown. A load 10 is modeled by a load lamp. Lighting system 100 is fed by monophasic alternating current taken between a phase 12 of a three-phase current circuit and the neutral phase 14 thereof.

In series with load 10 there is a winding 16, which impedance affects the voltage supplied to the load. Winding 16 is wound on a magnetic core 18, a second winding or buck/boost transformer 20 being also wound thereon. Buck/boost transformer 20 will also be referred to herein as a buck/boost transformer 20.

Adjustment of the power supplied to load 10 is based on adjustment of the impedance of winding 16, in turn a function of the current flowing through buck/boost transformer 20. Indeed, impedance of winding 16 will be zero when core 18 has reached magnetic saturation by means of buck/boost transformer 20, a situation arising when a determinate drive or control current is forced through the buck/boost transformer 20, just corresponding to core saturation. In this situation the voltage drop across winding 16 will be zero. For lower values of the drive or control current, down to zero, saturation of core 18 correspondingly decreases, and correspondingly the impedance of winding 16 increases, up to a maximum value to which corresponds the maximum drop of the voltage feeding the load.

The drive or control current is supplied to winding 20 by means of an autotransformer 22 having multiple regulation taps leading to a relay control board 24. By properly combining the opening and closing positions of the individual relays of board 24, it is possible to accomplish the change of the magnetizing current flowing through winding 20, and therefore achieve a voltage supply at load 10 less or higher than the mains rated value. It also has a by-pass subcircuit so that in the event of a malfunction of the switching relays or an interruption or intervention of internal safeties, the system will automatically switch to the by-pass position, without requiring external switching devices.

In multi-phase arrangement applications, not described in detail because it merely consists of applying an identical device between each phase and the neutral, the by-pass position can be reached by only one phase, while the others operate regularly according to what has been programmed, which will be described later. The by-passed phase keeps a fixed reduction step of 25 V in order to avoid, even in the most unfavorable situations, the voltage exceeding the lamp rated values. Therefore the system operates in a "fail safe" logic mode.

The device has the ability, by virtue of the taps of autotransformer 22, of being inserted in supply arrangements having different voltage ratings, for example of 277–220–208–120 V, and frequencies of 50/60 Hz, simply by changing an internal connection.

The advantages of the device are multiple:
digital commutation
reduced dissipated power
low servicing requirements
very quick response times
tolerances of output voltages definable as a function of the number of the code switching elements
no harmonic distortion.

The functional control of the switching relays of board 24 is carried out by a microprocessor unit 26, responsive to the external situations received by suitable signal transducers, such as a luminosity probe 52 (see FIG. 3), an analog light sensor, a photoelectric cell, a fog or traffic probe, etc.

FIG. 2 diagrammatically shows a preferred embodiment of board 24, allowing the number of autotransformer 22 taps required for covering the use field to be reduced. To this end board 24 comprises a switching section 242, advantageously working without creating any electric arc, and a section 244 adapted to invert the voltage on winding 20. Thus, the fixed 25 V voltage reduction also used for the by-pass function as mentioned above, can be added to or subtracted from the change which can be obtained by means of the autotransformer 22 taps, for example 45 V as a maximum. Consequently the operative voltage output from the regulator spans from +20 V to –70 V, with respect to the input voltage.

The microprocessor unit 26 also has the ability to graduate the operation of autotransformer 22 to determine such suitable rise and descent ramps of the voltage supplied to load 10; the latter is preserved from too abrupt changes and rushes. The same means are used to keep the output voltage steady with variable input voltage.

Moreover such means as to reset the operating program of the system can be advantageously provided for, so that, in the event of current failure, it will start again from the situation relating to the first lamp switch-on, acting with due gradually whatever the transducer position might be.

The block diagram of the control part of the device is diagrammatically illustrated in FIG. 3, where various modules are shown: microcontroller 26, a random access memory 28, a read only memory 30, and an erasable programmable memory 32, a clock/calendar 34, a communication port 36 and a modem 38, a second communication port 40, particularly for the connection to expansion modules for multi-phase execution, a display unit 42 and a data input unit 44, an analog transducer unit 52 such as a luminosity, fog, or traffic probe and the like, an analog output 54, one or more bus-connected relay boards 24, and inputs 46, 48 e 50 for the upstream voltage, downstream voltage and line current, respectively.

By means of the data input unit 44, a computer connected to communication port 36 or via modem 38, memory 28 can be programmed for custom operating cycles with respect to standard operating cycles, based on lock/calendar 34, in turn managed by microcontroller 26.

Figure 4:
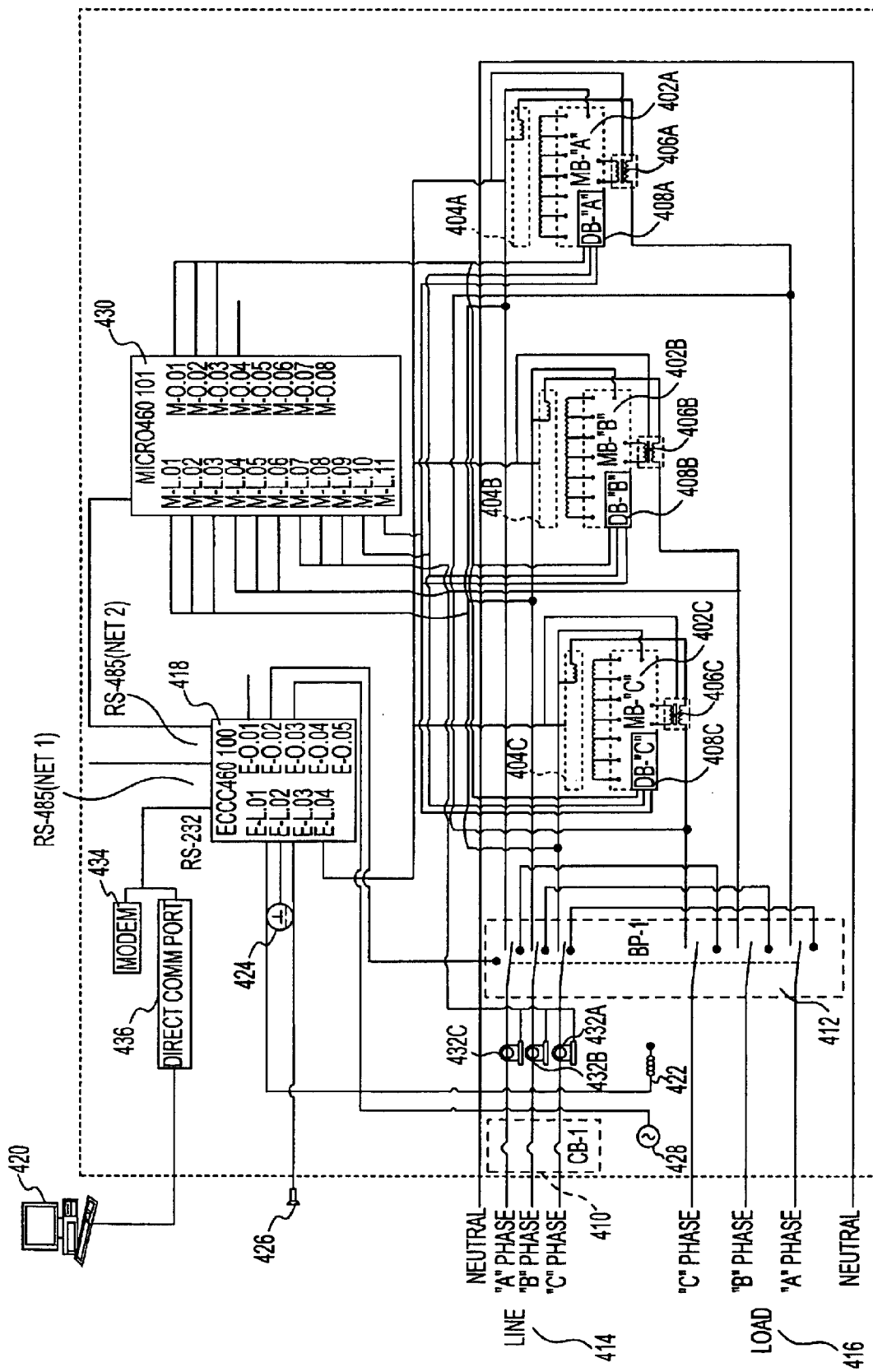
FIG. 4 schematically illustrates an embodiment of the present invention.

FIG. 4 is a diagrammatic illustration of the EnergySaver system of the present invention which utilizes the power reduction device illustrated in FIGS. 1–3. The system includes three main relay boards 402 corresponding to each of the three phases: 402A, 402B, and 402C. Each main relay control board 402 is a relay control board similar to relay control board 24 shown in FIG. 1 Each main relay board 402 (402A, 402B and 402C) includes a corresponding autotransformer 404 (404A, 404B, and 404C). Each autotransformer 404 is a device similar to the autotransformer 22 shown in FIG. 1.

Each of main relay boards 402 (402A,402B and 402C) also has a corresponding buck/boost transformer 406 (406A, 406B, and 406C). Each buck/boost transformer 406 is similar to buck/boost transformer 20 discussed with respect to FIG. 1. Both autotransformers 404 and buck/boost transformers 406 are comprised of toroidal transformers. Each main relay board 402 (402A, 402B, and 402C) also includes an analog-to-digital transducer 408 (408A, 408B, and 408C).

Main circuit breaker 410 allows the input line power 414 to be disconnected from the system. Bypass contactor 412 contains two contactors. Bypass contactor 412 allows the power control devices of the present invention (i.e. the main relay boards 402) to be bypassed under alarm or maintenance conditions. When bypass contactor 412 is switched to the bypass state, the line power input 414 is connected directly to load 416, bypassing the power reducing components of the present invention (i.e. main relay boards 402 and associated components).

Processor 418 is an ECCC460100 controller which receives inputs from various input detectors and provides output control signals according to an internal program and user settings either received from personal computer 420 or programmed directly from the ECCC460100 keypad associated with processor 418. Personal computer 420 runs a graphical user interface (GUI), an example of which is described in more detail with respect to FIGS. 6–13. The user interface allows a user to input settings and control parameters to processor 418. Processor 418 contains the following input/output (I/O) and communication ports (E-I designated ports are input ports and E-O designated ports are output ports):

E-I.01: this input port receives an analog signal from enclosure temperature probe 422. The temperature probe is located in an enclosure containing many of the components of the present invention such as main relay boards 402, autotransformers 404, buck/boost transformers 406, current sensors 432, circuit breaker 410, bypass contactor 412, processor 418, I/O board 430, etc.

E-I.02: this input port receives a digital reset signal from reset button 424.

E-I.03: this input port receives an analog signal from light sensor 426. Light sensor 426 senses ambient light level.

E-I.04: this input port receives a digital signal from a bi-metal fixed setpoint thermostat in each autotransformer 404 on all three phases, and also receives a digital signal from a thermostat in each buck/boost transformer 406 on all three phases. These bi-metal fixed setpoint thermostats that are wound in the cores of the transformers. These thermostats detect an overheating condition within the transformer. If any one of these six thermostats closes, then an ON signal will be received by this input port. The thermostat closes when there is an overheating condition.

E-O.01: This output port provides a digital ON-OFF signal which can be output to a contactor connected to a load to turn on and off the load.

E-O.02: this output port outputs a digital signal which activates bypass contactor 412. When bypass contactor 412 is activated, the power reducing device of the present invention is bypassed, and the line voltage 414 is connected directly to the load 416.

E-O.03: this port outputs a digital signal which activates cooling fan(s) 428.

RS-232: with "D" shell direct connect—For communication with a modem 434 to an external system. This port is also used for communication with a direct serial communication port plug-in 436 for communicating with a personal computer 420 or laptop.

RS-485 (Net 1): This communication port provides communication with a network, gateway, router, etc.

RS-485 (Net 2): This communication port provides communication with Input/Output Board (I/O) 430. It also could provide communication to a series of daisy-chained I/O board's.

Input/Output (I/O) Board 430 contains the following input and output ports:

M-I.01: Voltage In L1 (analog). This input port senses the input line voltage on Line 1 (phase A).

M-I.02: Voltage In L2 (analog). This input port senses the input line voltage on Line 2 (phase B).

M-I.03: Voltage In L3 (analog). This input port senses the input line voltage on Line 3 (phase C).

M-I.04: Voltage Out L1 (analog). This input port senses the output load voltage on Line 1 (phase A).

M-I.05: Voltage Out L2 (analog). This input port senses the output load voltage on Line 2 (phase B).

M-I.06: Voltage Out L3 (analog). This input port senses the output load voltage on Line 3 (phase C).

M-I.07: Current In L1 (analog). This input port receives an analog input signal representative of the current in Line 1 (phase A) from current transformer 432A.

M-I.08: Current In L2 (analog). This input port receives an analog input signal representative of the current in Line 2(phase B) from current transformer 432B.

M-I.09: Current In L3 (analog). This input port receives an analog input signal representative of the current in Line 3(phase A) from current transformer 432C.

M-I.10: Coil Fuse Failure (by phase): M-I.10 input port senses an open circuit caused by a blown coil fuse. There are two coil fuses per phase that protect each buck/boost transformer 406. As described with respect to FIG. 7, a notification is sent to computer 420 indicating the phase of the coil fuse failure.

M-I.11: Transformer Fuse Failure (by phase): M-I.11 input port senses an open circuit caused by a blown transformer fuse on any of the phases. The transformer fuses protect mainly autotransformers 404 and relay boards 402. As described with respect to FIG. 7, a notification is sent to computer 420 indicating the phase of the transformer fuse failure.

M-O.01: Control signal L1 (analog): This control signal provides an output voltage ramp to analog-to-digital transducer 408A which controls the amount of power reduction performed by main relay board 402A.

M-O.02: Control signal L2 (analog): This control signal provides an output voltage ramp to analog-to-digital transducer 408B which controls the amount of power reduction performed by main relay board 402B.

M-O.03: Control Signal L3 (analog): This control signal provides an output voltage ramp to analog-to-digital transducer 408C which controls the amount of power reduction performed by main relay board 402C.

M-O.04: This digital output signal activates an alarm buzzer, light, or similar warning output indicator.

M-O.05: Spare

M-O.06: Spare

M-O.07: Spare

M-O.08: Spare

The main relay boards 402, transformers 404 and 406 and associated components, processor 418, and I/O board 430 form the EnergySaver system of the present invention and will be referred to herein as an "EnergySaver." FIG. 16 illustrates the use of EnergySavers in stand-alone and in networked applications.

FIG. 16A shows the use of a single EnergySaver 1600 system within a facility 1614 in a stand-alone application. EnergySaver 1600 is connected to user terminal 1612 (user terminal 1612 is the same as personal computer 420 in FIG. 4). EnergySaver 1600 is shown controlling 4 separate loads within facility 1614: loads 1602, 1604, 1608, and 1610.

FIG. 16B illustrates the use of the EnergySaver system in a networked application. At least one EnergySaver is located in each of building 1616, park 1626, residence 1636, football stadium 1642, and industrial plant 1638. FIG. 16B shows the EnergySaver 1618 in building 1616 controlling 3 loads 1620, 1622, and 1624. Park 1626 contains an EnergySaver 1628 controlling 3 loads 1630, 1632, and 1634. Although only one EnergySaver is shown in each of building 1616 and park 1626, multiple EnergySavers could be located in each location. Each EnergySaver can control one or more distribution panel of ballasted lighting loads or other loads.

The EnergySavers in each location communicate with user terminal 1644 via network 1640. The user terminal displays an interface, for example the interface depicted in FIGS. 6–13. The user can enter setpoints, schedules, and control methods, via user terminal 1644, which are then sent to the processor in the selected EnergySaver.

Network 1640 can be a wide area network (WAN) such as the Internet. Each EnergySaver can be assigned an IP address and a domain name. The user could then access the desired EnergySaver by entering the appropriate domain name into the user terminal 1644.

Network 1640 could also be a local area network (LAN). In this case, multiple EnergySavers in a single facility or area can be connected to the LAN, and controlled by a single user terminal.

Utility company 1646 can also connect to network 1640. Utility company 1646 can provide electricity price information to user terminal 1644. This price information can be used to reduce demand during high price periods. User terminal 1644 can also receive other communications from utility company 1646. For example, the utility company can send a request to user terminal 1644 that all loads be reduced by 15% due to an energy shortage condition. Alternatively, the utility company could send a request to user terminal 1644 that all the loads in Football Stadium 1642 be reduced by 15%. It is also possible that the EnergySavers could be programmed to respond directly to requests from the utility company 1646. For example, the utility company could send a signal directly to industrial plant 1638, instructing the EnergySaver to reduce power by 15%.

Figure 5:
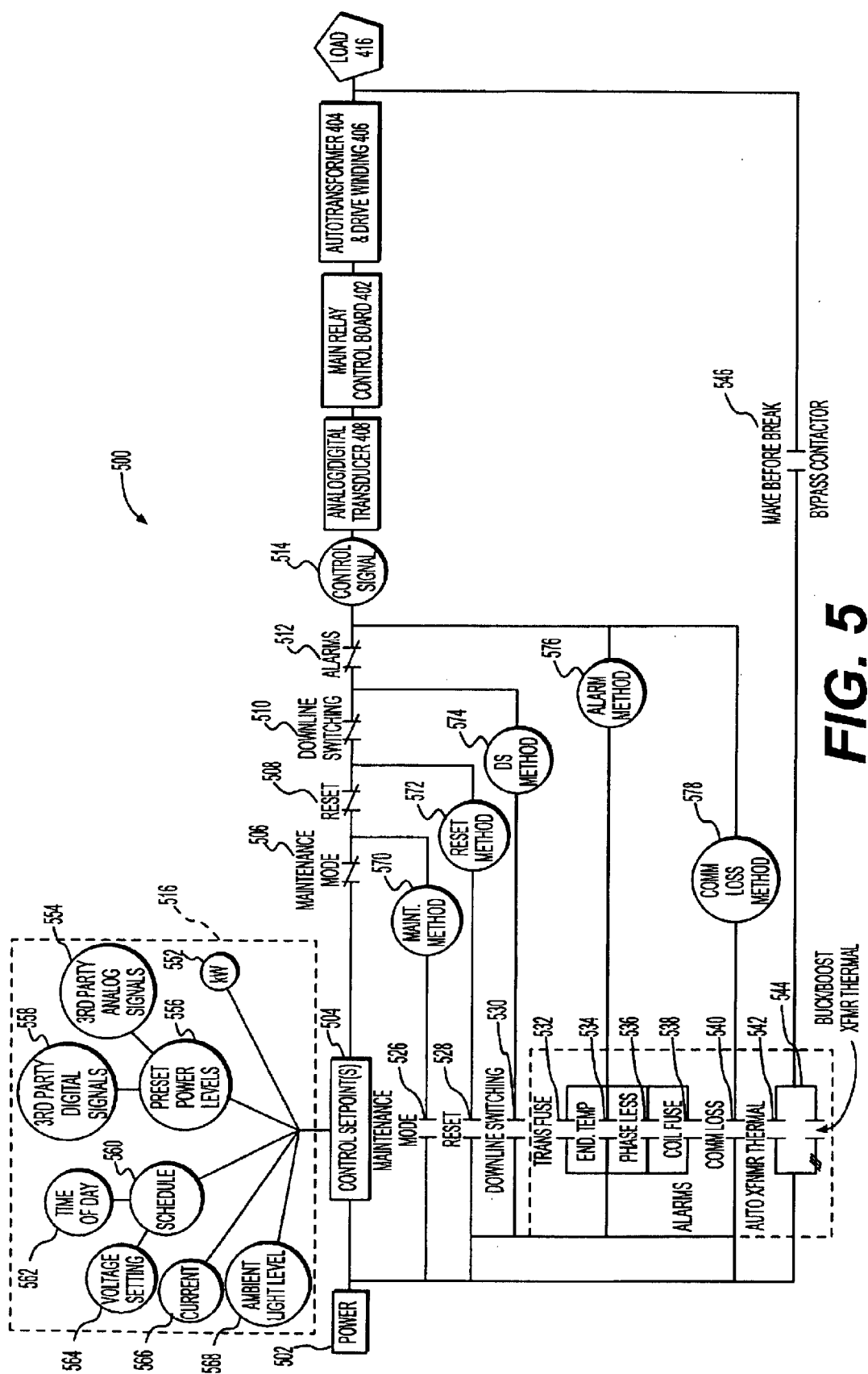
FIG. 5 is a logic diagram that conceptually illustrates a control algorithm used in an embodiment of the present invention.

FIG. 5 is a logic diagram that conceptually illustrates the algorithm used by processor 418 to control the main relay boards 402 based upon various inputs from input detectors and user-entered setpoints. The "logic points" shown in FIG. 5 do not represent physical devices, but instead illustrate conceptually the software method run by processor 418.

Normal Operation

During normal operation, processor 418 generates a control signal 514 which controls the main relay boards 402 in such a way that one or more user-selected input variables 516 are kept within user-specified control setpoints 504. Using a user interface running on personal computer 420, the operator can select one or more of input variables 516 to use for control and one or more control setpoints 504.

Normal operation of the system of the present invention occurs when logic points 506, 508, 510, and 512 are all closed. When any of these logic points is activated the logic point "opens" to illustrate that control signal 514 no longer responds to input variables 516 and control setpoint 504. Instead, processor 418 uses one of alternative control methods 570, 572, 574, 576 or 578, depending on the condition which has occurred. Each of these conditions will be explained in more detail later in the section entitled "Special Operating Modes".

During normal operation, processor 418 controls the system by generating an analog control signal 514 which gets transmitted to analog-to-digital transducers 408 on all three phases via I/O board 406 (output ports M-O.01–3). Analog-to-digital transducers 408 converts the analog control signal 514 into a digital value which controls the opening and closing of individual relays on each main relay board 402. The opening and closing of individual relays on main relay board 402 changes the magnetizing current flowing in buck/boost transformers 406 which changes the output delivered to load 416.

Processor 418 adjusts the control signal in order to achieve a desired output at load 416 in accordance with the user's selection of input variables 516 and control setpoint (s) 504. Using either computer 420 or the keypad on processor 418, the user essentially programs processor 418 to control the EnergySaver system in a desired manner. Some examples of control operation will now be described.

Single Input Variable Operation

The simplest form of control is to use a single input variable and a single control setpoint. With this form of control method, processor 418 controls the system so as to maintain a selected input variable within a selected control band. As an example of this type of control operation, assume that the EnergySaver system of the present invention is controlling the lighting for a park. A user chooses the use of ambient light level input variable 568 as the single input variable. A user enters a control setpoint 504 of "75 foot-candles." Processor 418 then senses ambient light level 568 as detected by light sensor 426. Processor 418 then generates a control signal 514 which maintains the system at an ambient light level of 75 foot-candles (actually, within a specified control band around 75 foot-candles).

If the ambient light level increases above 75 foot-candles, then the control signal 514 is adjusted to reduce the output delivered to load 416. If the ambient light level decreases below 75 foot-candles, then the control signal 514 is adjusted to increase the output delivered to load 416. This example demonstrates single input variable control operation of the system where the single input variable is ambient light level 568, and the single control setpoint is 75 foot-candles.

As another example of single input variable operation, the user could choose the input variable kW 552 and a control setpoint of 55 kW. Processor 418 would then generate a control signal 514 which maintains the load within a control band centered around 55 kW. If the utility line power 414 were to increase for some reason, and the power delivered to the load increased above the upper limit of the control band, then processor 418 would reduce the control signal 514 to lower the power delivered to the load back down to within the control band.

Instead of single input variable control operation, the user could also program processor 418 to control the system based on a combination of input variables 516 and/or a combination of control setpoints 504. Two examples of this kind of operation using two input variables and two control setpoints will now be described. These methods of control operation will be referred to as 1) Primary Input Variable with a Secondary Limit Function, and 2) Primary Input Variable with a Secondary Input Reset Variable.

1) Primary Input Variable with a Secondary Limit Function

In this type of control operation, the user selects a primary input variable and a primary control setpoint. The user also selects a secondary input variable and a secondary control setpoint "limit." The user also specifies whether the secondary control setpoint limit will be a "lower" limit or an "upper" limit. The secondary input variable then acts as a limit on the primary control variable.

Processor 418 generates a control signal 514 which controls the system so as to adjust the primary input variable until it matches the primary control setpoint, without exceeding the secondary limit. As an example, suppose the user selects kW 552 as the primary input variable with a primary control setpoint of 56.5 kW. Suppose the user also selects ambient light level 568 as the secondary input variable and a secondary lower control limit setpoint of 30 foot-candles.

With these user selections, processor 418 generates a control signal 514 which adjusts the power delivered to the load until the power reaches 56.5 kW. However, the light level is never allowed to drop below 30 foot-candles due to the secondary limit. If the light level drops below 30 foot-candles, the power to the load will be increased until the light level is no longer below 30 foot-candles, even if a power greater than 56.5 kW is needed. Therefore, processor 418 controls the system according to the primary input variable unless the secondary limit setpoint is reached, in which case the primary control setpoint is overridden and the secondary control setpoint limit becomes the controlling setpoint.

2) Primary Input Variable with a Secondary Input Reset Variable

Another example of a control method using two input variables is referred to as a primary input variable with secondary input reset variable. With this method of operation, the user selects a primary input variable and a primary input variable operating range. The user also selects a secondary input variable and a secondary input variable operating range. The secondary input variable acts upon or "resets" the control setpoint of the primary variable in a linear progression. For example, suppose the user selected a primary input variable of kW 552. Suppose the user specified the primary variable operating range as 30 kW to 60 kW. Suppose the user specified the secondary variable as ambient light level 568 and the secondary input variable operating range as 70 fc to 35 fc.

With these selections, processor 418 generates a control signal 514 which attempts to make the primary input variable match the primary control setpoint. However, the primary control setpoint is "reset" by the secondary input variable. This means that when the ambient light level is 70 fc, then the primary control setpoint is 30 kw. When the ambient light level is 35 fc, then the primary control setpoint is 60 kW. Any ambient light level in between the specified high and low limits range will cause a linear and totally proportional kW control setpoint within it's specified high and low limits range. This example can be represented by the following equation:

$$\text{Primary Control Setpoint (kW)} = -6/7 \times \text{ambient level (fc)} + 90$$

The two control methods described above describe two control methods which utilize two input variable control. These control methods are described by way of example only. Control methods of other combinations of input variables could also be used, including combinations of three or more input variables. In addition to the standard input variables 516, any other 3rd party input device can be brought into the system, through an input from the processor 418 or I/O board 430 for use as a primary or secondary control setpoint variable.

Input Variables

Each of input variables 516 will now be described in greater detail. Ambient Light Level input variable 568 refers to the analog signal from light sensor 426 which is input to port E-I.03 on processor 418. Current input variable 566 refers to the current signals received from current transformers 432 and input to ports M-I.07–I.09 on processor 418. Current input variable 566 allows processor 418 to control the system so as to maintain a specified current level.

Figure 9:
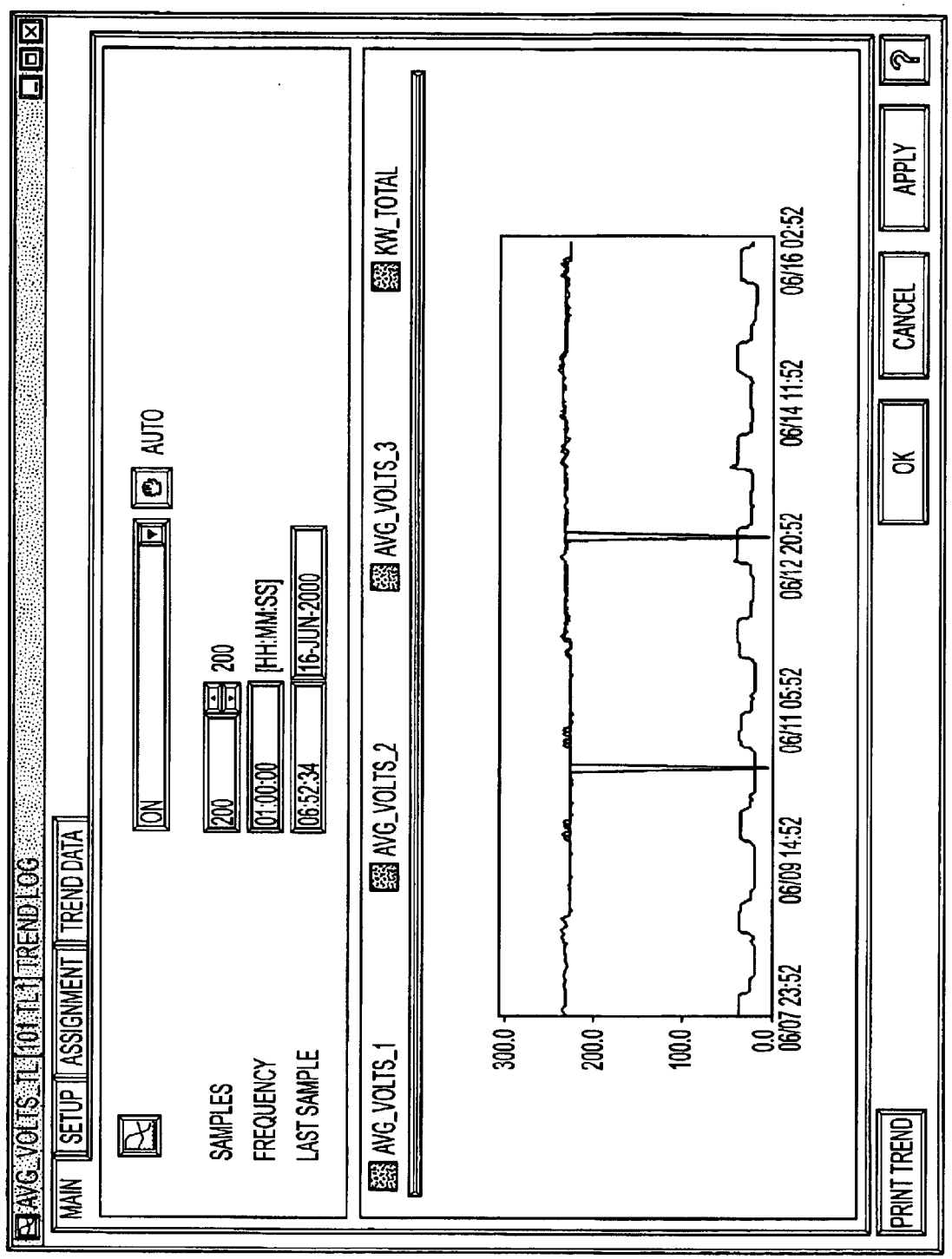
FIG. 9 is an example of a graphical trend log screen in an embodiment of the present invention.

Voltage setting input variable 564, time of day input variable 562, and schedule variable 560, allows the user to specify a schedule of different voltage settings for different times of day or days of the week. For example, the user could select a voltage setting of 230 Volts lasting between 8:00–9:00 PM on Monday and 270 volts lasting between 9:00 PM and 10:00 PM on Monday. An example of a schedule is shown in FIG. 9.

kW (kilowatts) input variable 552 is a calculated value based on the following calculation: Average Phase to Phase Voltage X Average 3 Phase Current X Square Root of 3 (for a three phase circuit) X Power Factor. The user can specify a kilowatt level at which to maintain the output to the load.

Processor 418 can also accept 3rd party digital signals 558 and 3rd party analog signals 554. To illustrate control using a 3rd party digital signal, suppose a building has its own proprietary building automation system that runs the lights and other power distribution in the building. The building receives electric power from the utility company at a price that varies over the course of a day. At 1:00 PM the price is 2.5 cents per kilowatt-hour. At 2:00 PM every weekday, the price climbs from 2.5 cents to 5.5 cents. At 4:00 PM the price goes back down to 2.5 cents. The building automation system produces a 3rd party digital ON-OFF signal which is transmitted to an processor 418 of the present invention. At 2:00 PM every day the building automation system changes the signal from OFF to ON to inform the EnergySaver system of the present invention that the high price has now kicked in. At 4:00 PM the building automation system changes the digital signal changes from ON to OFF. Thus the signal is ON when the price of electricity is high.

Processor 418 accepts the 3rd party digital ON-OFF signal from the building automation system. The signal could be received by any one of processor 418's RS-485 connections or the RS-232 connection, or any communication port. Processor 418 can be programmed to reduce base load power level by 15% whenever an ON signal is received from the building owner. The level of power reduction can be entered by a user into personal computer 420 and is referred to as "Preset Power Levels" 556 in FIG. 5. When the signal returns to OFF the power is brought back up to its previous level. Thus, when the price of electricity is high, processor 418 decreases the load. When the price of electricity is low, processor 418 increases the load.

The system of the present invention can also accept 3rd party variable analog signals 554. For example, the building automation signal could send processor 418 a 0–10 volt signal. When the signal rises to 3 Volt, processor 418 drops the power delivered to the load by 10 kW. When the signal rises to 5 volts, processor 418 drops the power delivered to the load by 15 kw. When the signal rises to 10 v, processor 418 drops the power delivered to the load by 30 kW. Thus the building automation system sends a high voltage signal when the price of electricity is high, and a lower voltage signal when the price of electricity is low.

Special Operating Modes

Normal operation of the system of the present invention occurs when logic points 506, 508, 510, and 512 are all closed. When any of these logic points is activated the logic point "opens" to illustrate that control signal 514 no longer responds to input variables 516 and control setpoint 504. Instead, processor 418 uses a different control method to determine control signal 514. Logic point 512 opens when any alarm occurs. Logic point 510 opens when a downline switching condition (explained below) occurs. Reset logic point 508 opens when the reset button 420 is depressed. Maintenance mode logic point 506 opens when maintenance mode is entered. When any of these logic points opens, an alternative control method is switched in. Each of these conditions will now be explained in more detail later in the section entitled "Special Operating Modes."

Maintenance Mode: Maintenance mode is a mode which a user can manually enter to determine if any lamps or ballasts need to be replaced. A user can manually enter maintenance mode by pushing a Maintenance mode button 1402 (shown in FIG. 14) which is located on a keypad associated with processor 418.

When maintenance mode button 1402 is depressed, logic point 506 opens and logic point 526 closes. Maintenance Mode method 570 will determine control signal 514. When in maintenance mode, the control signal 514 is adjusted so that main relay boards 402 ramp down to their lowest voltage output setting for 15 minutes. Any lamps or ballasts that are nearing the end of their useful life will begin to "flicker", strobe, cycle or extinguish, indicating to the user that it should be replaced. This feature is meant to signal to the user that a replacement lamp or ballast is needed before it actually burns out.

Reset Mode: A reset button 420 is connected to processor 418 input port E-I.02 (FIG. 4). When the user presses reset button 420, logic point 508 opens and logic point 528 closes. Thus, the reset method 572 determines the value of control signal 542 rather than control setpoint 504 and input variables 516. The reset method 572 adjusts the control signal 514 until the output voltage at the load is equal to a "Setpoint for Starting Voltage." As will be described further with respect to FIG. 6, the Setpoint for Starting Voltage is a user selectable value which is entered into field 648 on the user interface 600 running on personal computer 420. The reset mode will last for a predetermined period of time. As logic diagram 500 indicates, if the reset button is pressed during maintenance mode, the reset method overrides the maintenance mode method. Thus, in this mode, the reset method is applied to control signal 514.

Downline Switching Mode: Downline switching is an event caused by a new load being turned on. When a new load is switched on, there is an inrush of current. Processor 418 senses a downline switching condition when the sensed current from current transformer 432 exceeds a user selectable value called the "Setpoint For Auto Reset." (this setpoint is entered by the user into the Setpoint for Auto Reset field 644 in user interface main screen 600 which is discussed with respect to FIG. 6). When a downline switching condition occurs, downline switching logic point 510 opens, and downline switching logic point 530 closes, thereby inserting downline switching method 574 in lieu of the controlling setpoint 504.

The downline switching method 574 causes control signal 514 to be adjusted such that the load is operated at the Setpoint for Starting Voltage for a predetermined time period. Therefore, the downline switching method 574 performs the same as the reset method 572. As shown by logic diagram 500, the downline switching mode overrides both the reset mode and the maintenance mode.

Alarm Operation

There are seven different alarms: transformer fuse 532, enclosure temperature 534, phase loss 536, coil fuse 538, communication loss 540, autotransformer thermal 542 and boost thermal 544. Activation of any of these alarms will cause alarm logic point 512 to open.

At the onset of a transformer fuse alarm, enclosure temperature alarm, phase loss alarm, or coil fuse alarm, the corresponding logic point 532, 534, 536, or 538, respectively, closes. This causes alarm method 576 to adjust control signal 514. A transformer fuse alarm occurs when there is a blown transformer fuse on any phase. There are transformer fuses on each phase protecting mainly autotransformer 404. A coil fuse alarm occurs when there is a blown coil fuse on any phase. There are coil fuses on each phase which protect buck/boost transformers 406.

A phase loss occurs when there is an open circuit on any of the phases (for example, when one of the phases from line power 414 coming from the utility company drops to zero voltage). An enclosure temperature alarm occurs when the enclosure temperature (as determined by enclosure temperature sensor 424) exceeds a predetermined setpoint.

Alarm method 576 operates by causing the control signal 514 to drop to zero. This causes all of the relays on main relay boards 402 to open. This is referred to as "soft bypass mode." Even with all of the relays open, there will still be current passing through autotransformers 404 and buck/boost transformers 406. The amount of energy reduction provided by the transformers will depend on the ratio of the windings in autotransformer 404 compared to buck/boost transformer 406. For example, in one embodiment of the invention, the energy reduction in soft bypass mode is 15% reduction. In soft bypass mode, the load will operate at reduced power. The system can then operate in soft bypass mode until the operator can locate and fix the source of the problem and correct the alarm condition.

Figure 7:
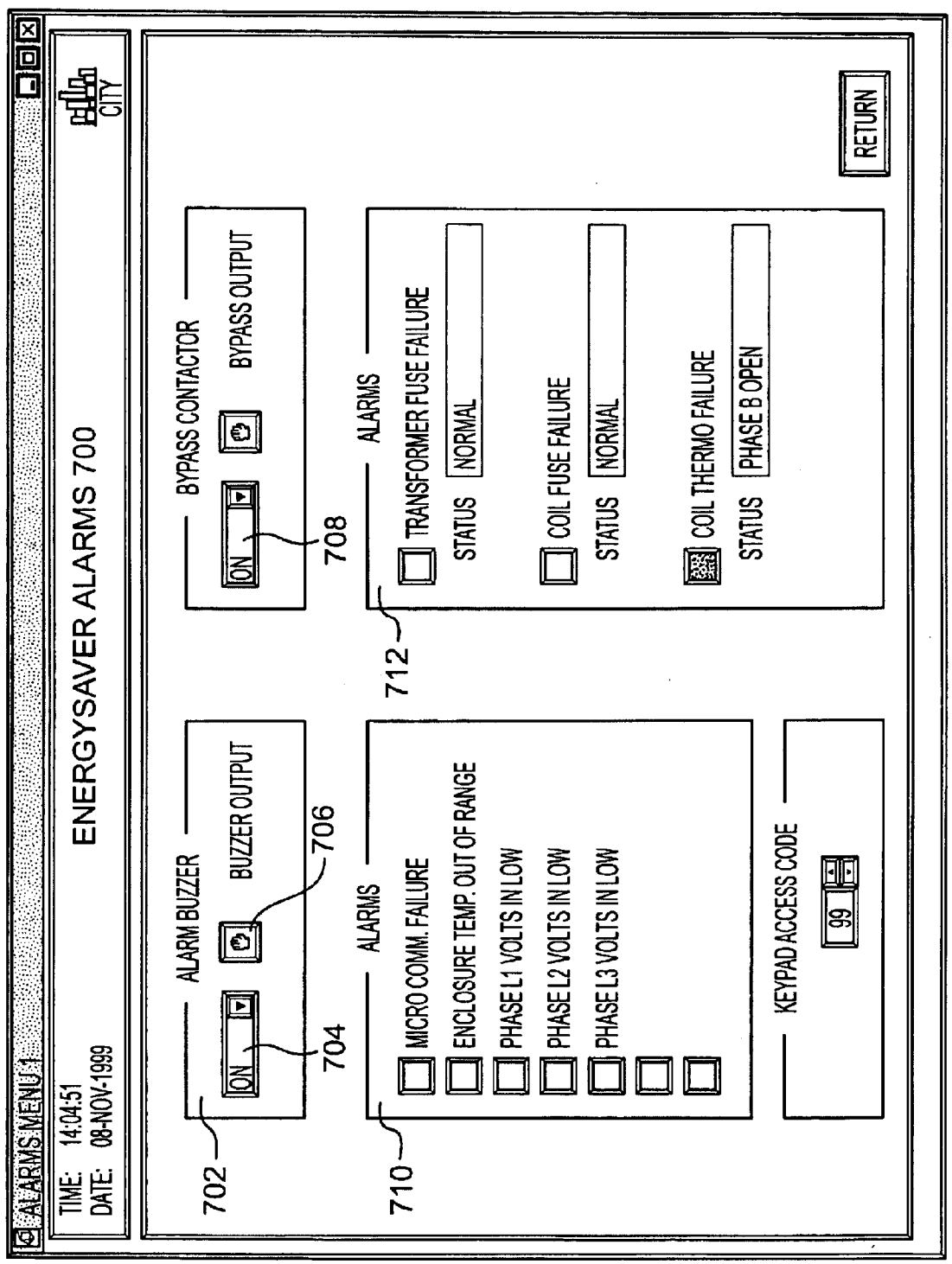
FIG. 7 is an example alarm and information screen in an embodiment of the present invention.

The user can also be notified of the type of alarm condition occurring, and which phase is affected. As will be described later, alarm screen 700 shown in FIG. 7 depicts an example of an alarm screen which notifies the user of the type of alarm condition and the affected phase.

A Comm Loss (Communications Loss) alarm occurs when communications are lost with I/O board 430. When a Comm Loss alarm occurs, alarm logic point 512 opens and Comm Loss logic point 540 closes. This causes Comm Loss method 578 to operate control signal 514. Using Comm Loss method 578, processor 418 will continue to adjust control signal 514 according to the last control setpoint 504 that existed before communications with I/O board 406 were lost.

The final two alarms are the autotransformer thermal alarm and the buck/boost transformer thermal alarm. All of the autotransformers 404 and buck/boost transformers 406 contain bi-metal fixed setpoint thermostats that are wound in the cores of all of these toroidal transformers. These thermostats detect an overheating condition within the transformer. When the temperature in one of the autotransformers 404 or buck/boost transformers 406 exceeds a predetermined threshold, the corresponding bimetallic thermostat will close, sending a signal to processor 418 (input port E-I.04) which initiates a autotransformer alarm 542 and/or buck/boost transformer thermal alarm 544.

When an autotransformer thermal alarm occurs, alarm logic point 512 opens and auto transformer thermal logic point 542 closes. When a buck/boost transformer thermal alarm occurs, alarm logic point 512 opens, and boost thermal logic point 544 closes. For either of these alarms, make before break bypass contactor logic point 546 also closes. The closing of logic point 546 indicates that processor 418 activates bypass contactor 412. When bypass contactor 412 activates, the utility line in power 414 is connected directly to load 416, bypassing the power control system of the present invention (i.e. all of the relay control boards and transformers). When the transformer(s) cool and the thermostat contacts open, logic points 542, 544, and 546 will open, and thus bypass contactor 402 will switch positions thereby automatically placing the system back on-line.

Figure 6:
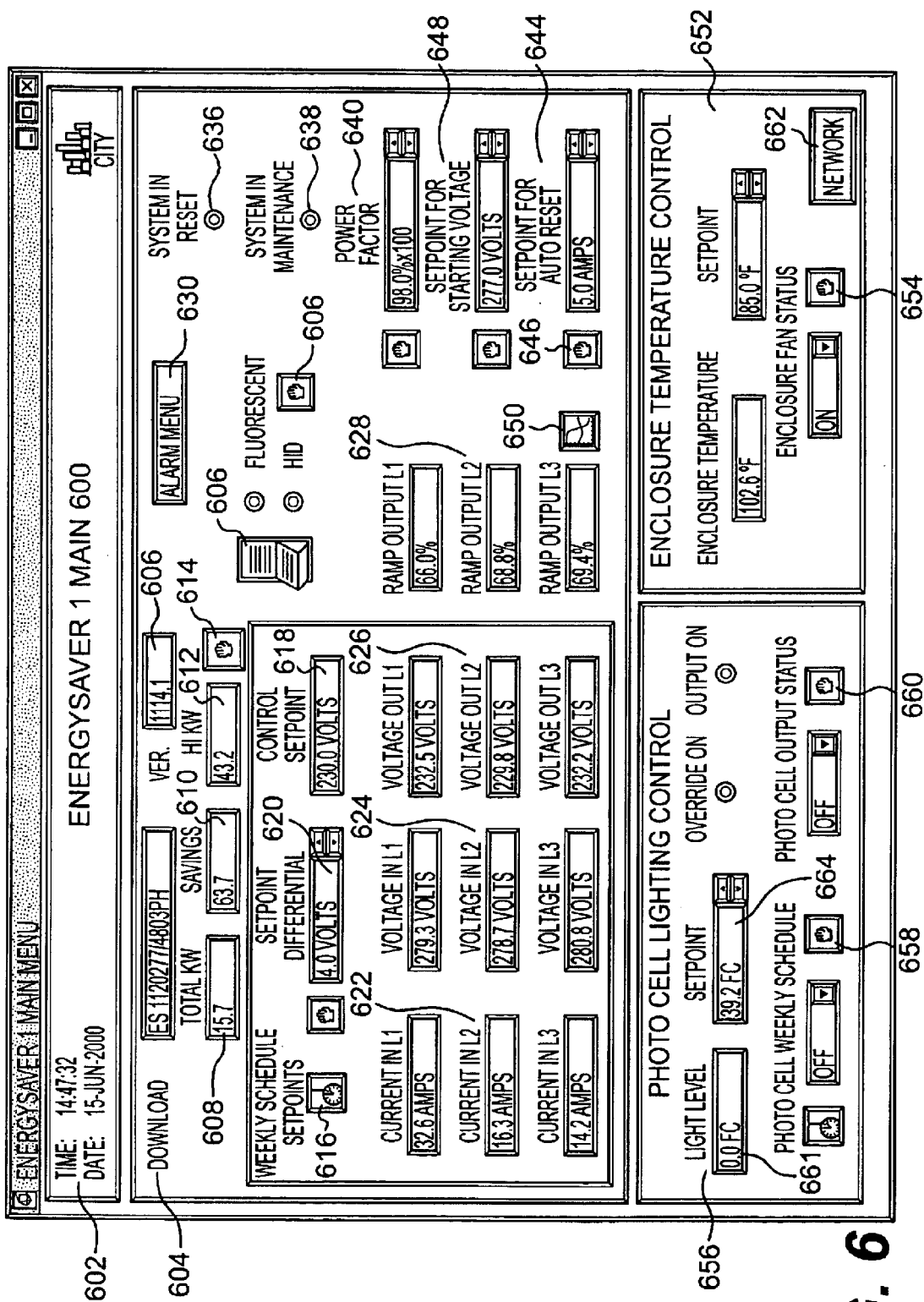
FIG. 6 is an example main screen in an embodiment of the present invention.

FIGS. 6–13 show examples of screen displays for an example user interface running on user terminal/personal computer 420. FIG. 6 shows a main screen 600 of a Graphical User Interface (GUI) [Windows 9X® based] that is displayed on personal computer 420. Main screen 600 allows the user to monitor various parameters of the system, and to specify the desired manner of system control.

Main screen 600 displays the time and date 602 obtained from processor 418. Download field 604 indicates the size, voltage, and number of phases controlled. The example shown in FIG. 6 indicates this is a 120-ampere device with 277/480-volt input control of 3 phases. Version field 606 displays the current version of software. The example shown in FIG. 6 indicates that this is software version 1114.1.

Total KW field 608 displays the existing power consumed by the load on the device. Hi KW field 612 is the highest load on the system in kilowatts since mid-night. Savings field 610 displays the percentage of power that the invention is currently saving. Savings field 610 is calculated by dividing Total KW 608 by Hi KW 612 and expressing as a percentage. For example, FIG. 6 shows that the power control system is reducing the power delivered to load 416 by 63.7%. When hand button 614 is pressed, the Hi KW field 612 value is reset.

When the user presses Weekly Schedule Setpoints Button 616, a Weekly Schedule Setpoints screen 800 (shown in FIG. 8) is brought up on the display. This screen allows the user to choose control setpoints for scheduled times of the day and week. This will be described in further detail with respect to FIG. 8.

Figure 8:
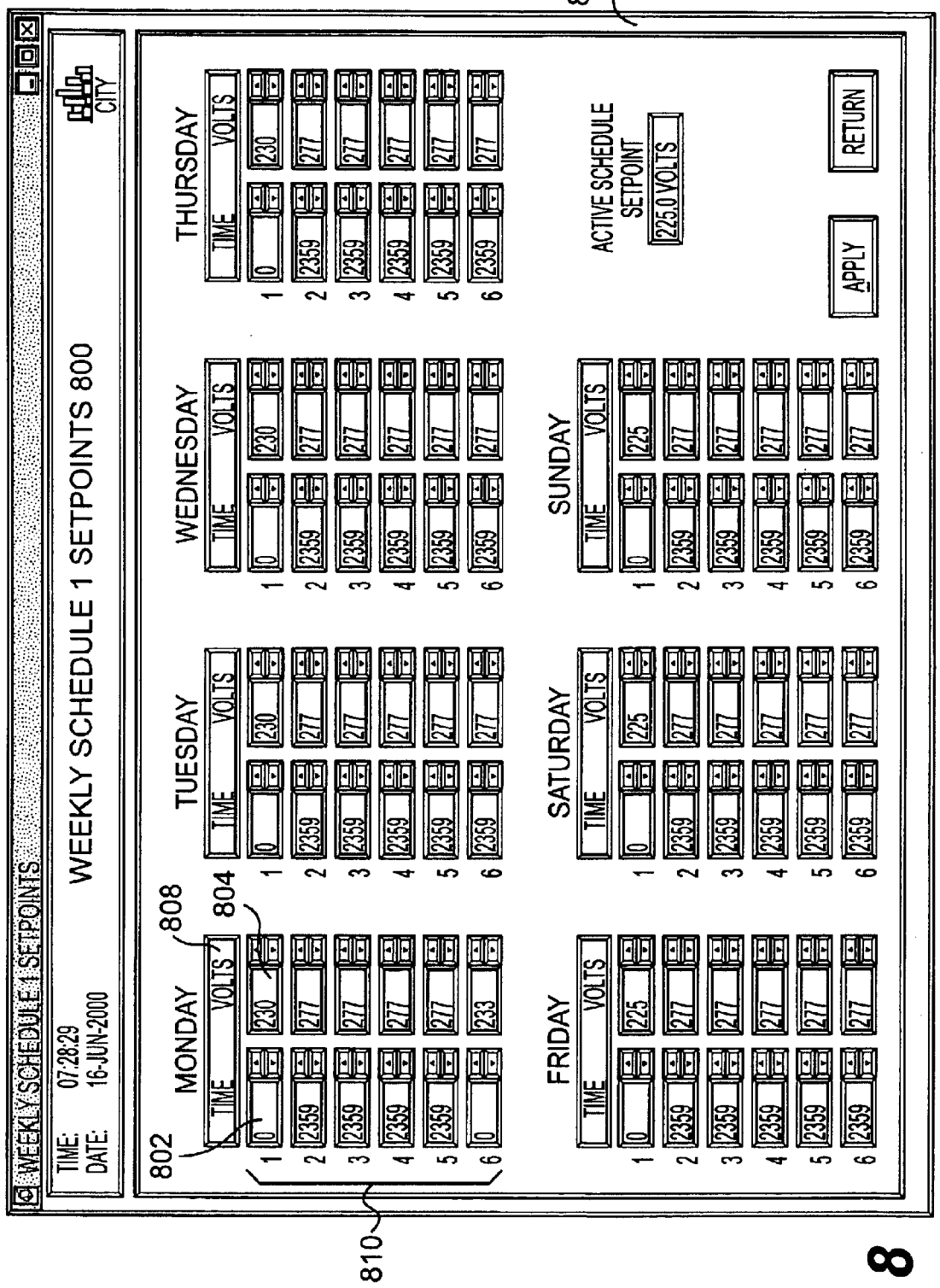
FIG. 8 is an example weekly schedule setpoints screen in an embodiment of the present invention.

Control Setpoint 618 displays the control setpoint which the system is present using for control. The user can not enter a value directly into control setpoint field 618. During normal operation, the control setpoint 618 is taken from the user-specified values in Weekly Schedule Setpoints Screen 800 (FIG. 8). FIG. 6 displays an example screen with the control setpoint 618 is set at 230.0V. Thus, processor 418 is controlling the system to maintain output voltage at the load at 230.0 V. As discussed with respect to FIG. 5, the system can control the output based on other input variables besides voltage. For example, control setpoint field could be set to "75 foot-candles" or "56 kW." In this instances, processor 418 would control the system to maintain an output of 75 foot-candles and 56 kW, respectively. Control setpoint 618 can be modified to be based on any of the input variables 516 shown in FIG. 5 (voltage setting, current, ambient light level, schedule, time of day, 3rd party digital signals, preset power levels, 3rd party analog signals, and/or kW).

Setpoint Differential field 620 contains a hysteresis or dead band value which is adjustable to prevent the system from "hunting" the Control Setpoint 618 value due to fluctuations in utility line voltage 414. FIG. 6 shows that the setpoint differential value is currently set to 4.0 V. Thus, processor 418 will not act to reduce load output voltage unless it drifts above 234.0 volts. Processor 418 will not act to increase load output voltage unless it drifts below 226.0 volts. The Setpoint Differential field 620 can be set by the user by entering a new value into the field 620 or by clicking on the adjacent arrows.

If the system is using a two-input variable control method described previously, such as the (1) primary input variable with secondary limit function, or (2) primary input variable with secondary reset variable, then the control setpoint displayed in control setpoint field 618 will be the primary setpoint.

FIG. 6 depicts an example screen where the control method is using a primary input variable of voltage, and a secondary input variable of ambient light level with a secondary limit of 39.2 FC. Photo Cell Lighting Control section 656 allows the user to view and adjust the secondary variable and setpoint. Processor 418 senses ambient light level by receiving a signal from light sensor 426 (FIG. 4). Light level field 656 displays the current ambient light level as sensed by light sensor 425. Setpoint field 664 allows the user to enter a secondary limit setpoint in units of foot-candles. When a user clicks Photo Cell Weekly Schedule button 661, a schedule display screen similar to the one shown in FIG. 8 is brought up on the display and allows the user to specify different setpoints for different times of the day and week. The two hand buttons 658 and 660, when depressed, allow the user to manually override the status of the schedule or the actual output of processor 418.

Current In L1–L3 622 indicates the line side load by phase (Line L1 corresponds to phase A, Line L2 corresponds to phase B, and Line L3 corresponds to phase C). Voltage In L1–L3 624 indicates the line side input voltage by phase. Voltage Out L1–L3 626 indicates output voltage by phase. Ramp Output L1–L3 628 indicates by phase the percentage of maximum output presently being used. For example, if the maximum output were 300 Volts, then the lowest voltage available output would indicate 100% (the lowest voltage available is dependent on line voltage). A mid-point voltage between the lowest voltage and 300 volts output would indicate 50%. A 300 Volt output would indicate 0%.

If an alarm is present on the system, an alarm bell (not shown) will appear to the left of the Alarm Menu button 630. When Alarm Menu button 630 is depressed, Alarms screen 700 (shown in FIG. 7) will be brought up on the display.

Figure 14:
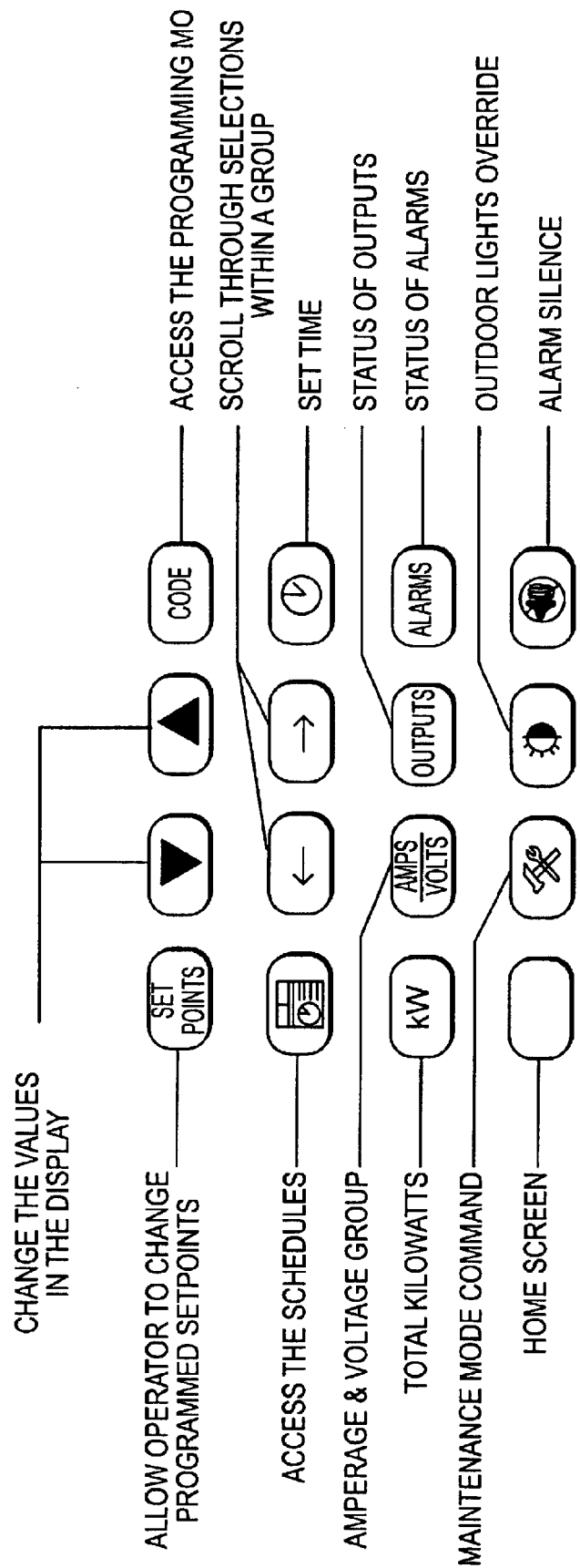
FIG. 14 schematically illustrates buttons in an embodiment of the present invention.
Figure 15:
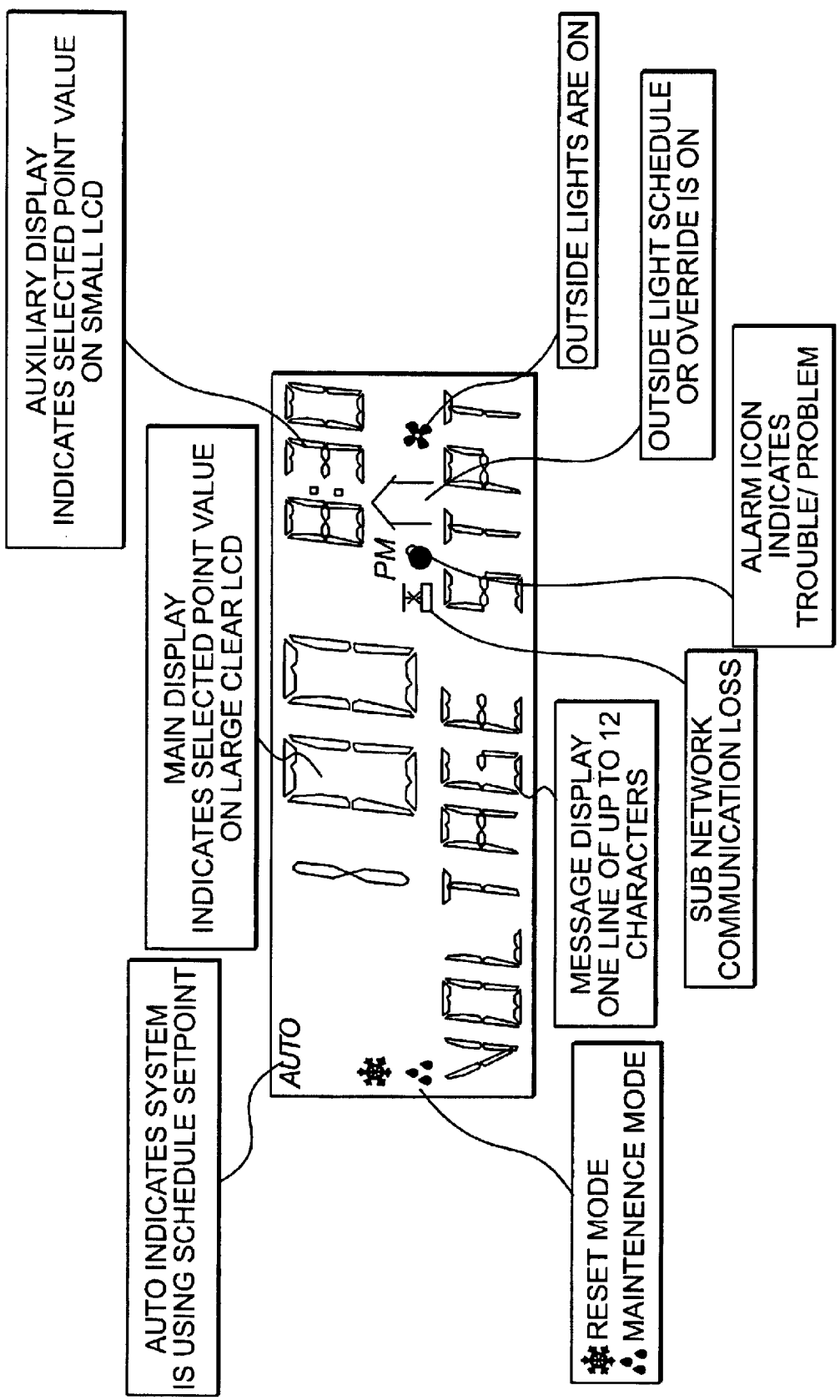
FIG. 15 depicts example display information in an embodiment of the present invention.
Figure 17:
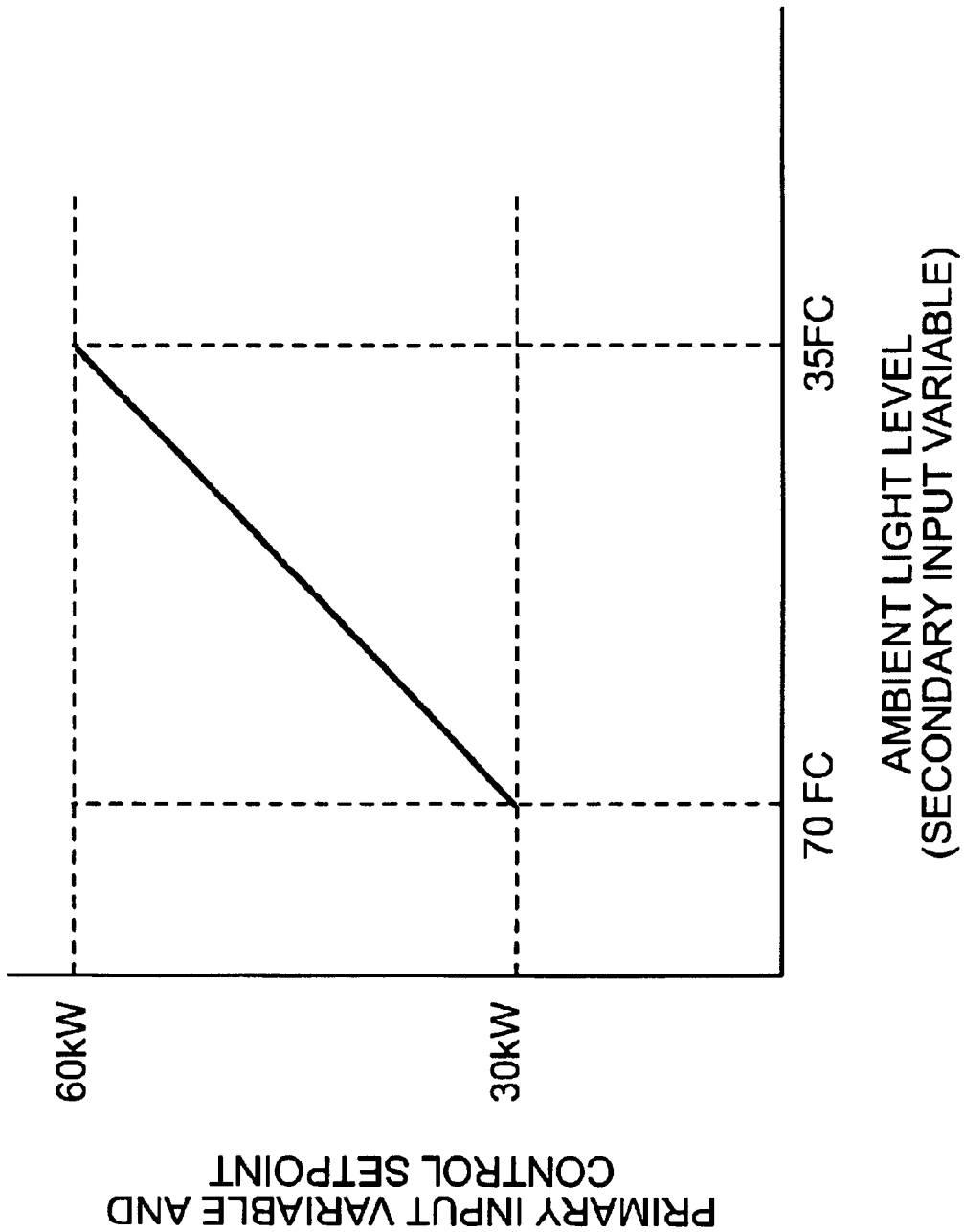
FIG. 17 is a graph of a primary input variable and control setpoint versus ambient light level.

System In Maintenance Light 638 lights when the "Maintenance" button 1402 is depressed (see FIG. 14). Maintenance button 1402 is located on the ECC460100 keypad associated with processor 418. System in Maintenance Light 638 remains on during maintenance operation.

Power Factor Field 640 is a value which should be input by the user when the system is first placed on-line. Power Factor field 640 is used to calculate kW.

Starting Operation

When ballasted lighting systems are first turned on, they require a higher starting voltage for a varying period of time, depending on the ballast/lamp combination, to properly ignite the lamp. If this is not accomplished and the voltage is allowed to remain at a lower level, the lamp may not properly ignite thereby possibly causing damage to the lamp and shortening it's life, or may not ignite at all.

The system therefore ramps up to a higher starting voltage when lights are first turned on. The system determines when lights are turned on by sensing an inrush of current (this is also referred to as a "downline switching" condition). Processor 418 senses current by receiving a signal from current transformers 432 via I/O board 430 (input ports M-I.07–I.09). When an inrush of current exceeds the value entered by the user in the Setpoint for Auto Reset field 644 (a user-specified value), then the control setpoint field 618 will change to the starting voltage specified in Setpoint for Starting Voltage field 644 (another user-specified value), and the system will accordingly ramp up the voltage supplied to load 416 to starting voltage.

Setpoint for Auto Reset field 644 is a value of current in amps, and represents an amount of increase in current. In the example screen shown in FIG. 6, Setpoint for Auto Reset field 644 is set to 5.0 Amps. Thus, if the system was operating at steady state at 25 amps and a new lighting load was switched on thereby increasing the current to 30 amps, then starting voltage operation would be triggered due to the 5 amp inrush of current.

The user specifies the starting voltage by entering a value into field Setpoint for Starting Voltage field 648. Processor 418 controls the ramp up to starting voltage by sending a signal to analog-to-digital transducers 408 via I/O board 430 (output ports M-O01, M-O.02, and M-O.03). During the starting voltage operation period, the control setpoint 618 will be changed to equal the starting voltage.

Starting voltage operation is also commenced when the reset button 424 (FIG. 4) is depressed. If a new load is introduced onto the system, but does not produce enough inrush current to generate a downline switching condition, the operator can manually induce starting voltage operation by pressing the reset button to start the new loads.

For both reset and load starting conditions, the system will stay at the starting voltage for a predetermined time period. Since a high intensity discharge (HID) lighting load will generally require a longer period at starting voltage than a fluorescent lighting load, the system will remain at starting voltage for a longer period of time for HID lighting loads than fluorescent lighting loads. The system determines which predetermined time period to use by the user setting of fluorescent/HID rocker switch 606. If the user sets this switch to fluorescent lighting loads, then the system uses a starting voltage time period corresponding to fluorescent lamps. If the user sets switch 606 to HID, then the system uses a starting voltage time period corresponding to HID lighting loads. There could alternatively be other options for other types of lighting loads, or even a field for a user to specify an exact time duration for remaining at starting voltage.

The user should choose a value to enter in Setpoint For Auto Reset field 644 which is a few amps less than the smallest load which could be switched on. This ensures that any time a new lighting load is turned on, processor 418 will sense that a new load has been switched on, and will ramp up to starting voltage in response.

FIG. 6 includes a number of hand buttons such as hand button 646. When a hand button is depressed, the value in the adjacent field cannot be changed from the keypad associated with processor 418. The values can only be changed from main screen 600 on computer 420.

During starting voltage operation, System In Reset light 636 turns on. System in Reset light 636 turns on when either a new load is turned on or the reset button 424 is depressed. Graph Button 650, when depressed, takes the user to the historical log illustrated in FIGS. 9 & 10, which allows the user to select points, timing, number filtering, etc. and can display the trend log as a line graph or in ASCII text.

Enclosure Temperature Control Section 652 provides for control of the enclosure cooling fan(s). Depressing the hand button 654 allows the user to manually override the operation of the cooling fan.

If the user clicks the Network button 662, a new screen is displayed which allows the user to choose which EnergySaver he or she wishes to communicate with. For example, with reference to FIG. 16B, the user could select Building 1616, or Park 1626 or Residence 1636, or Football Stadium 1642, or Industrial Plant 1638 or Utility Company 1646. As an another example, a single industrial plant could have five EnergySavers in the plant, each EnergySaver connected to a local area network (LAN). By clicking Network button 662, the user could select which EnergySaver within the plant to communicate with.

FIG. 7 is an alarm and information screen. Alarm Buzzer section 702 indicates the status of the alarm buzzer output 704. The alarm buzzer is controlled by output port M-O.04 on I/O board 430. Hand button 706, when depressed, allows the user to toggle alarm buzzer output 704 manually on or off.

Bypass Contactor status 708 displays the status of bypass contactor 412. As discussed previously, bypass contactor 412 is activated by an Auto Transformer Thermal condition or a Buck/Boost Transformer thermal condition.

This particular illustration shows a Coil Thermo Failure on "B" phase and therefore activated the alarm output and bypass contactor.

Alarms sections 710 and 712 indicates the type of alarm. Alarm section 712 also displays a text message in the status section indicating the phase on which the problem is occurring. The example screen shown in FIG. 7 is presently displaying a Coil Thermo Failure condition on the B phase, and therefore activated the alarm output and bypass contactor.

Keypad Access Code 714 is a numerical code for accessing the processor 408 keypad. The user can change this access number from this screen.

The Return button 716 returns the user to the main screen 600 in FIG. 6.

FIG. 8 displays Weekly Schedule Setpoints Screen 800. Screen 800 allows the user to specify control setpoints for different times of the day, and different days of the week. Each time field 802 and setpoint field 804 allows the user to enter a value for a starting time and primary control setpoint, respectively. Active Schedule Setpoint field 806 displays the control setpoint that is being used at the present moment.

The example Weekly Schedule Setpoints Screen 800 shown in FIG. 8 shows that the primary control setpoint is based on the voltage input variable. However, the user can also control based on any of the other input variables 516 shown in FIG. 5. By clicking on the word "Volts" 808, a new menu (not shown) is brought up on the display, which allows the user to control to a different input variable. For example, the user could select a primary control setpoint based upon kW or FC rather than Volts.

The user can set a secondary limit function or secondary reset variable by clicking on one of the schedule numbers 810 (1–6). For example, if the user clicks on the number 2 under Monday, a new window will be brought up on the screen (not shown). The window will ask the user whether he or she wishes to set a secondary limit function or secondary reset variable. For a limit function, the user will be asked to choose either a lower limit or an upper limit. For a reset variable, the user will be asked to enter primary input variable range and a secondary input variable range. The secondary limit function or reset variable entered by the user will only be in effect for the selected time period. For example, if the user enters a secondary lower limit of 39 FC for schedule number 2 on Monday, and schedule number 2 lasts from 10:00 AM to 11:00 AM, then the secondary lower limit of 39 FC will be in effect on Monday from 10:00 AM to 11:00 AM.

The user can enter control setpoints in the schedule shown in FIG. 8 in such a way that the power drawn by the load is reduced during times of the day when the electricity price is high. The load can be increased once the electricity price goes low. Additionally, if the price of electricity is higher on certain days of the week, the user can decrease demand on days that have a high price. The user achieves this control by entering appropriate setpoints into the corresponding time periods.

If the EnergySaver system of the present invention is controlling the lighting loads in a building, then the lighting loads would have reduced power input during periods of the day or days of the week when the electricity price was high. This solution to saving energy costs is preferable to shutting off loads or changing the thermostat in building or facility. Instead of making the building hot and uncomfortable, the lights are dimmed during periods of expensive electricity usage.

As an alternative to using a schedule like the schedule shown in FIG. 8, processor 418 could receive real-time price information from the utility company. Processor 418 could then adjust the power delivered to the load based on the price information, such that demand is reduced when the price is high, and demand is increased when price is low.

FIG. 9 depicts an example of a graphical Trend Log Screen 900. Screen 900 graphically displays historical trend data four points at a time. The voltage on all three phases and power (kW) is depicted as a function of time. FIG. 10 depicts an example of a text Trend Log Screen 1000. Screen 100 displays the same data as FIG. 9, except in text data form rather than in a graphical format. The two tabs at the top of FIGS. 9 and 10, labeled "Setup" and "Assignment" are for selection, numerical filtering and sampling of selected points to be trended.

Figure 11:
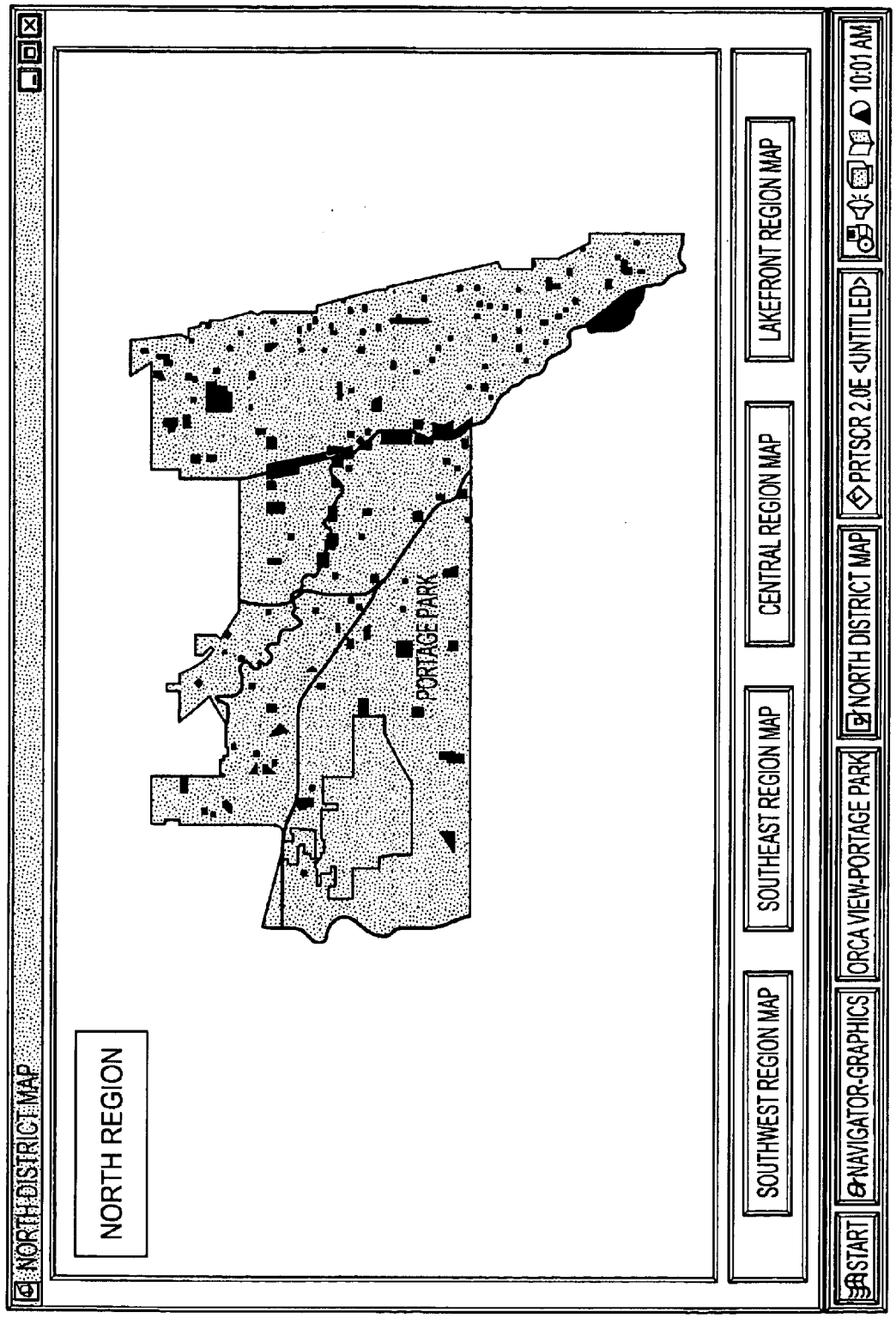
FIG. 11 is an example of a region map screen in an embodiment of the present invention.
Figure 12:
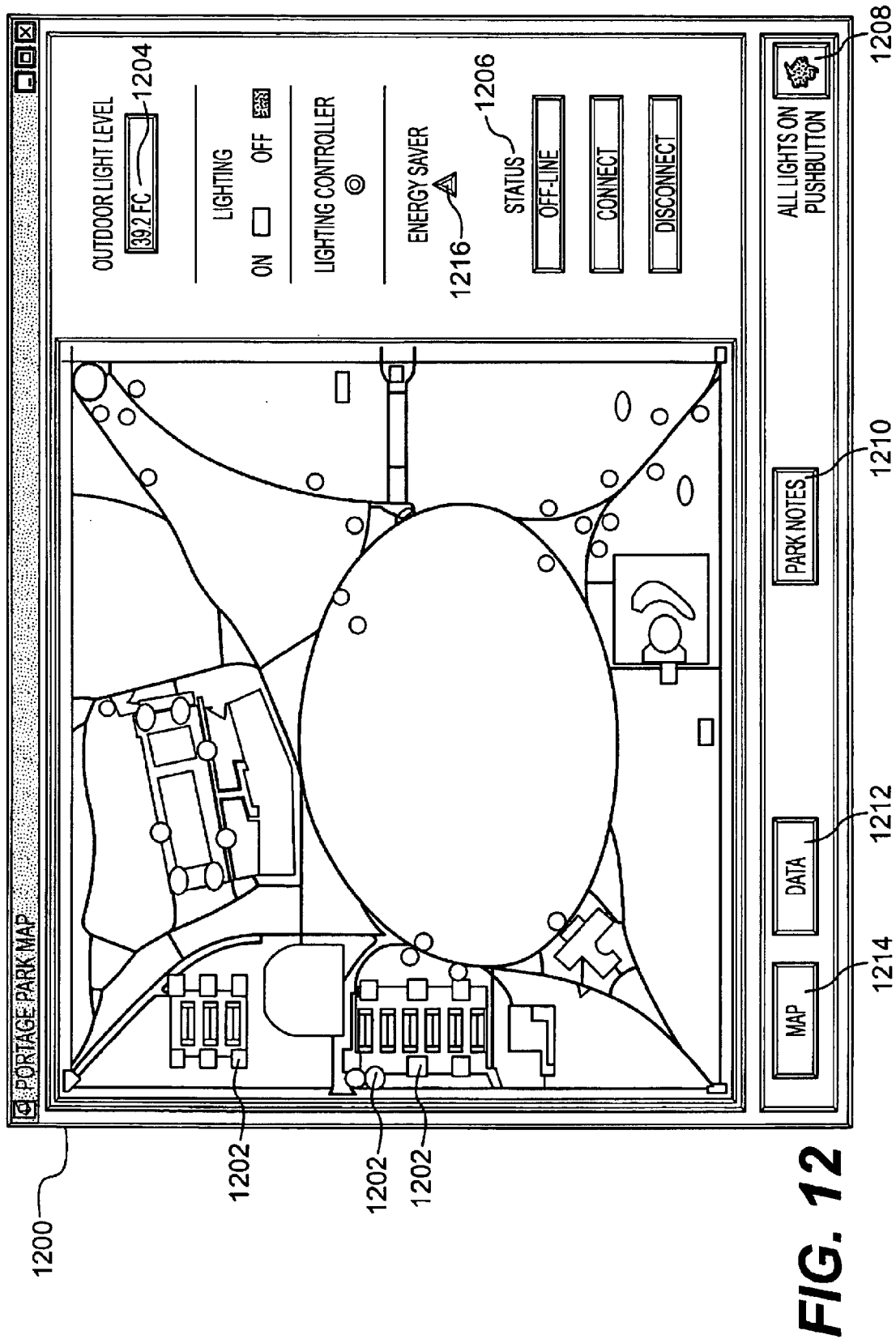
FIG. 12 is an example of a map screen 1200 in an embodiment of the present invention.
Figure 13:
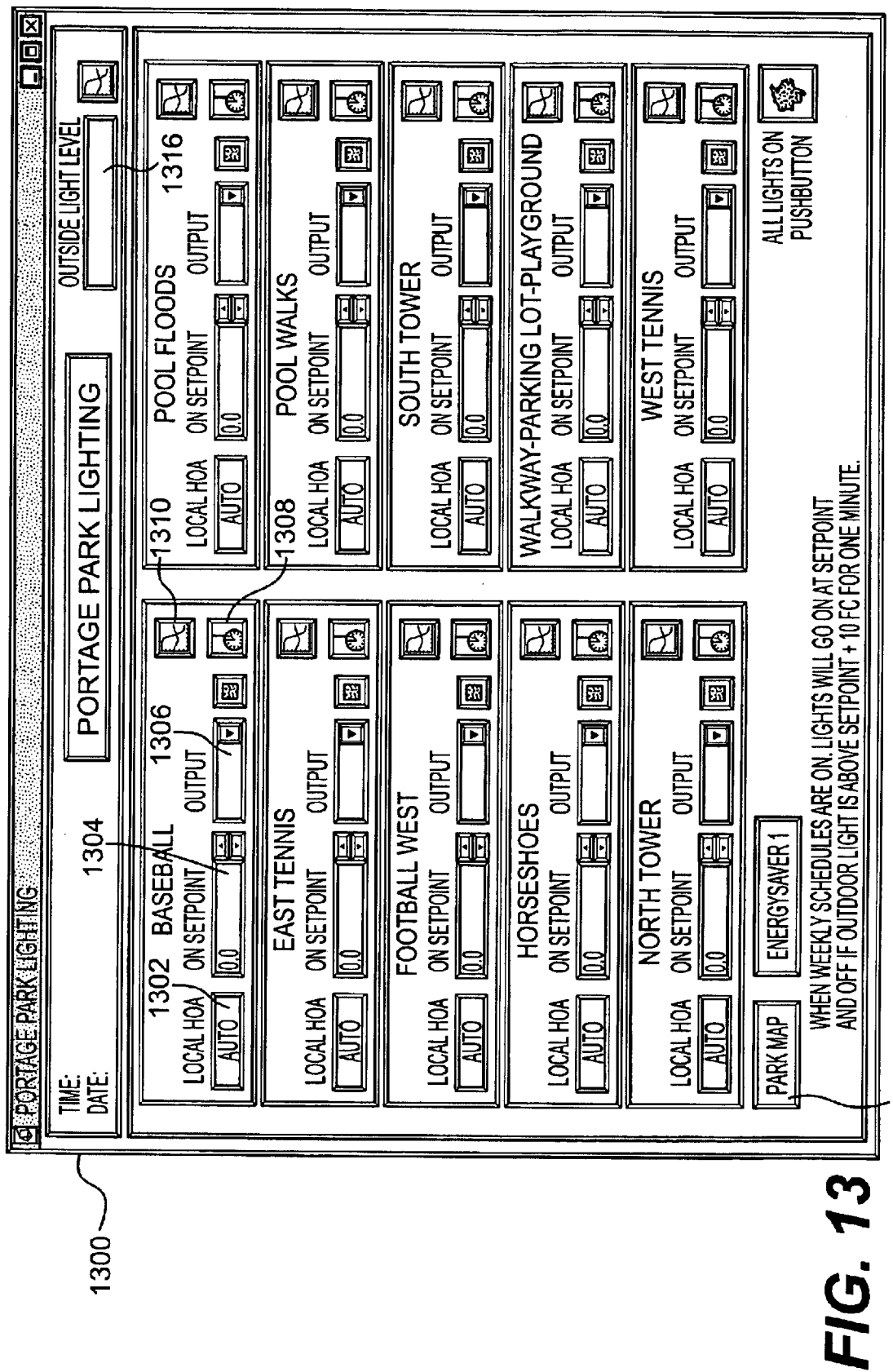
FIG. 13 is an example of a facility/area lighting screen in an embodiment of the present invention.

FIGS. 11–13 illustrate a feature of the invention that allows the user to control remote EnergySavers and loads from a remote user terminal via a communication link such as a modem or a network. Referring to FIG. 16B, for example, a user at user terminal 1644 can choose between EnergySavers located in building 1616, park 1626, residence 1636, football stadium 1642, and industrial plant 1638.

The example screens shown in FIGS. 11–13, refer to an example where a user is controlling many lighting loads located in a large park. The park has many several EnergySavers that are being controlled by a central user terminal. While this particular example illustrates a park, it could instead be a facility such as a building or an industrial plant, or a group of facilities such as shown in FIG. 16B.

FIG. 11 shows a Region Map Screen. This screen allows the user to choose one of five regions: Southwest Region, Southeast Region, Central Region, Lakefront Region, and North Region. FIG. 11 is currently showing the North Region map. When the user moves a cursor over a location on the map, the name of the location is displayed. The example shows a location being displayed called "Portage Park." If the user clicks on the selection, a map screen for the particular chosen facility or area as shown in FIG. 12 is brought up on the screen.

FIG. 12 is an example illustration of a map 1200 of Portage Park. Map screen 1200 graphically displays the status of loads in a particular area or facility. Rectangles and ovals 1202 represent lighting loads. The rectangles and ovals are colored gray when the lighting load is off and the rectangles turn yellow when the lighting load is turned on. Map screen 1200 shows the status of all loads in real time.

Outdoor Light Level 1204 is a field that displays the outdoor light illumination level in foot-candles. Status field 1206 displays the present communications status of the system (either off-line or on-line). When the system is off-line, then the lighting system presently being shown by Map Screen 1200 is not being controlled remotely. All Lights On Pushbutton 1208 is a "panic" pushbutton that overrides all lighting functions and turns all lighting loads on for security or any other critical reason.

If the user presses the Park Notes button 1210, that takes the user to a text area for notes or any other written information the user wishes to enter. If the user presses Data button 1212, the user is taken to the screen example shown in FIG. 13. If the user clicks Map button 1213, the user is taken back to the previous screen shown in FIG. 11.

FIG. 13 displays an example of a facility/area lighting screen 1300 for Portage Park. This screen allows the user to control lighting loads in several regions of Portage Park including baseball field lights, east tennis court lights, football west field lights, horseshoes area lights, north tower lights, pool flood lights, pool walk lights, south tower lights, walkway-parking lot lights, and west tennis lights. FIG. 13 is an example screen invoked by depressing Data pushbutton 1212 shown in FIG. 12. Each function contains the following points:

- Local HOA 1302 (Hand, Off, Auto)—Indicates the position of the manual override switch located on site.
- Illumination Level On Setpoint 1304—User selectable illumination level control setpoint (in foot-candles). The lights do not turn on until the ambient light level goes below the Illumination Level On setpoint 1304. Processor 418 of the EnergySaver sends an output signal from output port E-O.01 to the lighting contactor for the associated lights to turn on or off the lights.
- Output 1306 and Hand Button—Indicates the current status of the lighting output (on or off) and includes a Hand button for toggling the actual output.
- Schedule Button 1308—When depressed, take the user to a schedule set for that particular lighting function similar to the schedule screen shown in FIG. 8.
- Trend Log Button 1310—When depressed, take the user to the historical trend log information and set-up as previously described in FIGS. 9 and 10.
- Park Map Button 1312—When depressed, takes the user back to an illustration represented in FIG. 12.

EnergySaver Button 1314—When depressed, takes the user to the main screen 600 illustrated in FIG. 6.

Outside Light Level 1316 shows the present ambient illumination level and has its own historical trend log.

All Lights On Pushbutton 1318 is a global command that turns all lighting on for security or any other critical reason.

The schedule entries made by clicking on schedule button 1308 (and illustrated in FIG. 8) and the illumination level setpoint 1304 can be used individually or in combination with each other. For example, a user could choose to operate the East Tennis court lights from a schedule with no illumination level setpoint. Alternatively, the user could choose to operate the East Tennis court lights using an illumination level setpoint, but no schedule. Alternatively, the user could use both a schedule and an illumination level setpoint by entering a value into field 1304 and clicking on button 1308 to make a schedule entry. In this instance, the control method takes the following form: "The lighting function will be allowed to operate between the hours of (Schedule) with a control setpoint of (Scheduled Control Setpoint) as long as the illumination level is below (foot-candles)."

What is claimed is:

1. A system for saving energy by varying a base load, comprising:
    a power reduction device receiving electrical power from an electrical power source and outputting electrical power to a base load;
    a processor:
        a) receiving an input signal representing a characteristic of the base load;
        b) receiving a schedule from a user, the schedule including a plurality of control setpoints corresponding to a plurality of time periods during a day;
        c) generating a control signal based on the schedule, the time of day, and the input signal; and
        d) outputting the control signal to the power reduction device to control the amount of power delivered to the base load.

2. The system of claim 1, wherein the input signal is one of voltage, power, light level, or current.

3. The system of claim 1, wherein the input signal is received from a third party system.

4. The system of claim 1, wherein the processor generates a control signal based on a primary input signal and a secondary input signal.

5. The system of claim 4, wherein a secondary control setpoint acts as an upper limit or a lower limit to the primary input signal.

6. The system of claim 4, wherein the secondary input signal resets the primary input signal.

7. The system of claim 1, wherein processor outputs a control signal to ramp the load up to a starting voltage for a predetermined time period whenever:
    a) an inrush of current greater than a predetermined threshold is sensed; or
    b) a reset signal is received.

8. The system of claim 1, further including:
    wherein the processor is connected to a network, and the processor communicates with a user via the network.

9. The system of claim 1, wherein the processor has a digital output for connecting to a contactor, the digital output capable activating the contactor which turns on a connected load, when a user-selected setpoint is exceeded.

10. A system for saving energy costs by varying demand, comprising:
    a power reduction device receiving electrical power from an electrical power source and outputting electrical power to a base load; and
    a processor outputting a control signal to the power reduction device to decrease the power delivered to the base load in response to a rise in the price of electricity and increase the power delivered to the base load in response to a decrease in the price of electricity.

11. The system of claim 10, wherein the processor receives a schedule from a user, the schedule including a plurality of control setpoints for a plurality of time periods during a day, the processor generating the control signal based on the schedule and the time of day.

12. The system of claim 10, wherein the processor receives real time price information from a utility company associated with the electrical power source, the processor generating a control signal based on the price information.

13. The system of claim 10, wherein the processor receives a request signal from a utility company to decrease the load.

14. A method for saving energy costs by varying demand, comprising:
    a) receiving input electrical power from an electrical power source;
    b) decreasing the output power delivered to a base load in response to a rise in the price of electricity; and
    c) increasing the output power delivered to the base load in response to a decrease in the price of electricity.

15. The method of claim 14, further including:
    receiving a schedule from a user, the schedule including a plurality of control setpoints corresponding to a plurality of time periods during a day; and
    generating a control signal for controlling the power delivered to the load based on the schedule.

16. The method of claim 14, further including:
    receiving real-time electricity price information; and
    generating the control signal based on the real-time electricity price information.

17. The method of claim 14, further including:
    receiving a request signal from a utility company to decrease the load.

18. The method of claim 14, further including:
    receiving a first input variable signal representing a first characteristic of the load;
    receiving a first control setpoint from a user;
    generating the control signal so as to maintain the first input variable within a control band around the control setpoint.

19. The method of claim 18, further including:
    receiving a second input variable signal representing a second characteristic of the load;
    generating a control signal so as to maintain the first and second input variable signals within a user-specified control band.

20. The method of claim 18, further including:
    activating a contactor to turn on the load when the first input variable exceeds a user turn-on setpoint.

21. A system for controlling loads over a network, comprising:
    a power reduction device receiving electrical power from an electrical power source and outputting electrical power to a base load;
    a processor outputting a control signal to the power reduction device to control the amount of power delivered to the base load, the processor connected to a network; and a user terminal connected to the network, receiving control instructions from a user, sending the control instructions to the processor over the network, the processor generating the control signal based on the control instructions.

22. The system of claim 21, wherein the control instructions include a schedule of control setpoints.

23. The system of claim 21, wherein the processor receives real-time electricity price information over the computer network.

24. The system of claim 21, wherein the network is the Internet.

* * * * *